Nov. 12, 1968 K. D. SCHREYER 3,410,621

STORAGE CONSTRUCTION

Filed March 29, 1966 14 Sheets-Sheet 1

INVENTOR
KENNETH D. SCHREYER

BY

Brangley, Baird, Clayton, Miller & Vogel.

ATTYS.

Nov. 12, 1968 K. D. SCHREYER 3,410,621

STORAGE CONSTRUCTION

Filed March 29, 1966 14 Sheets-Sheet 2

Nov. 12, 1968 K. D. SCHREYER 3,410,621

STORAGE CONSTRUCTION

Filed March 29, 1966 14 Sheets-Sheet 3

Nov. 12, 1968 K. D. SCHREYER 3,410,621

STORAGE CONSTRUCTION

Filed March 29, 1966 14 Sheets-Sheet 5

STORAGE CONSTRUCTION

Filed March 29, 1966

14 Sheets-Sheet 7

Nov. 12, 1968 K. D. SCHREYER 3,410,621

STORAGE CONSTRUCTION

Filed March 29, 1966 14 Sheets-Sheet 12

Nov. 12, 1968 K. D. SCHREYER 3,410,621

STORAGE CONSTRUCTION

Filed March 29, 1966 14 Sheets-Sheet 14

United States Patent Office 3,410,621
Patented Nov. 12, 1968

3,410,621
STORAGE CONSTRUCTION

Kenneth D. Schreyer, Doylestown, Pa., assignor to Lyon Metal Products, Incorporated, Aurora, Ill., a corporation of Illinois Filed Mar. 29, 1966, Ser. No. 538,423
23 Claims. (Cl. 312—257)

ABSTRACT OF THE DISCLOSURE

The storage construction comprises a top plate, a reinforcement sheet having attachment portions secured to the underside of the top plate and reinforcement ribs between adjacent attachment portions, a pair of spaced apart mounting channels on the underside of the top plate, an edging on the periphery of the top plate, a plurality of storage units arranged beneath the top plate, each including a front frame and a rear top support respectively aligned with the associated mounting channels and secured thereto, a pair of finishing panels secured to the outsides of the end storage units, at least one of the storage units including a door having a front panel and a reinforcement sheet with spaced apart attachment portions secured to the rear side of the front panel and reinforcement ribs between adjacent attachment portions.

The present invention relates to storage assemblies and particularly improved structures for interconnecting storage units and to improved storage units and components thereof.

In summary, the storage assembly incorporating the features of the invention includes as one aspect thereof, an integral elongated top having a pair of spaced apart mounting channels disposed on the underside thereof and secured thereto, and a plurality of storage units arranged in side by side relationship beneath the top and secured thereto by means of the mounting channels, thereby to provide a compact and strong construction with good interconnection between the parts.

In a further aspect of the invention in connection with the foregoing aspect, there is provided an improved storage assembly wherein an integral base is provided joining the lower ends of the storage units in the storage assembly.

In a still further aspect of the invention there is provided a storage assembly that can accommodate a wide variety of storage units such as cabinets, bookcases, pedestals with drawers therein, and the like, each of the storage units having a construction such that it can be readily connected to the associated top of the storage assembly.

In another aspect of the invention in connection with the foregoing aspect, there is provided an improved top for the storage assembly including a flat elongated top plate and a reinforcing sheet with reinforcing ribs thereon attached to the underside of the top plate, a body of mastic being disposed between the contacting surfaces of the top plate and the reinforcing sheet with welds made therethrough to interconnect these parts, thus to provide a strong connection therebetween and to provide good sound deadening properties therein.

In still another aspect of the invention there is provided in a storage assembly of the type set forth an improved channel and mounting nut construction which cooperate to provide improved connections between the elongated top and the several storage units connected thereto.

In yet another aspect of the invention, there is provided a cabinet having an improved door thereon including an outer panel and a reinforcing sheet disposed adjacent to the rear side of the outer panel, the reinforcing sheet being corrugated and bonded to the outer panel both by an adhesive and welds extending through the adhesive to provide a rigid construction with good sound deadening properties.

In yet another aspect of the invention there is provided an improved door for use in closing the front opening in a cabinet, the door being lightweight yet rigid and being provided with suitable pulls and pick-up arms and abutment surfaces for co-operation with the associated cabinet and the associated doors.

Further features of the invention pertain to the particular arrangement in a storage assembly of the storage units and the top and the base and the various parts thereof whereby the above-outlined and additional operating features thereof are attained.

The invention, both as to its organization and method of operation, together with further objects and advantages thereof, will best be understood by reference to the following specification taken in connection with the accompanying drawings, in which.

Figures 1, 2:
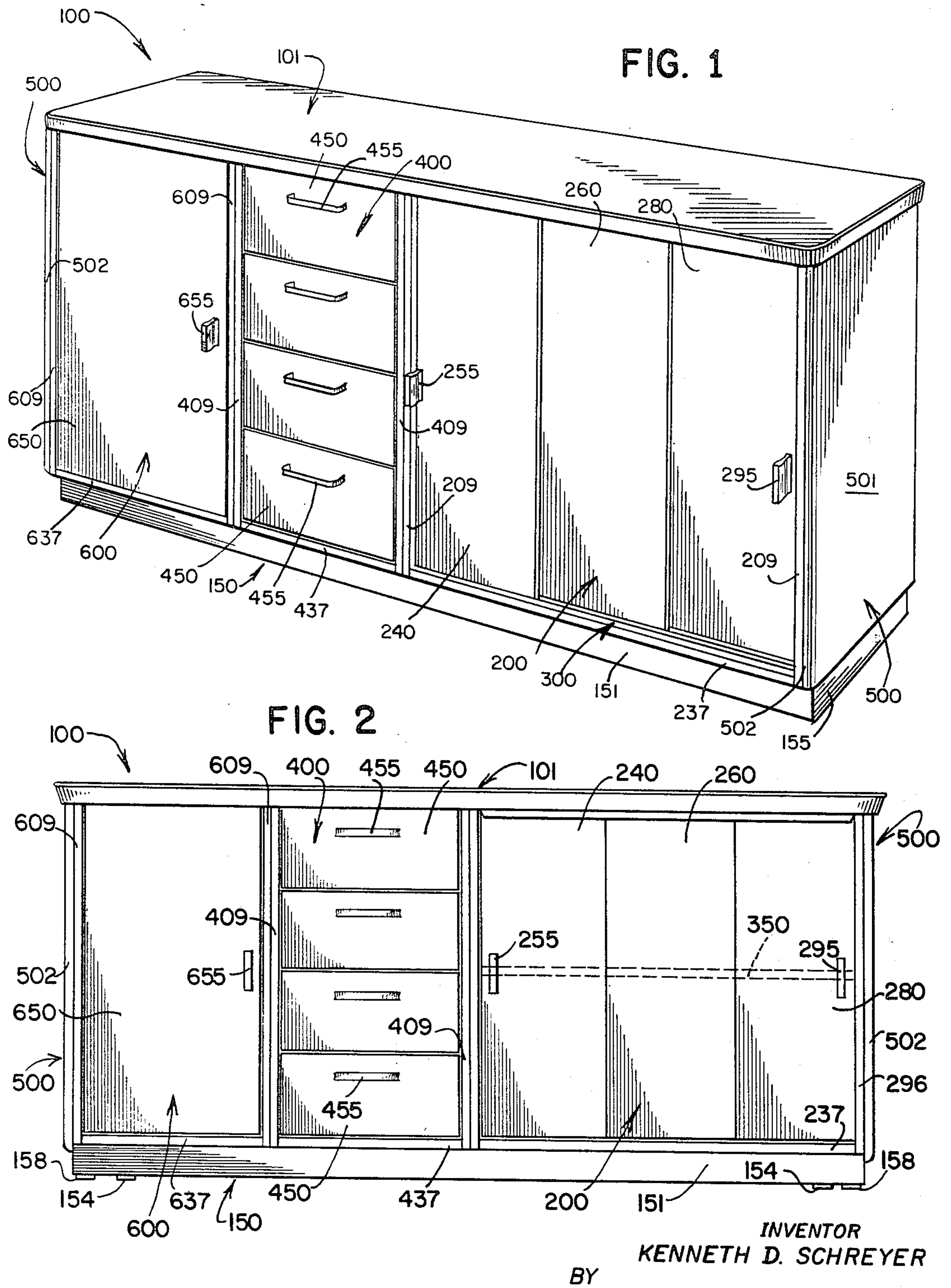
FIGURE 1 is a front perspective view of a storage assembly made in accordance with and embodying the principles of the present invention.
FIG. 2 is a front elevational view of the storage assembly of FIG. 1.
Figure 3:
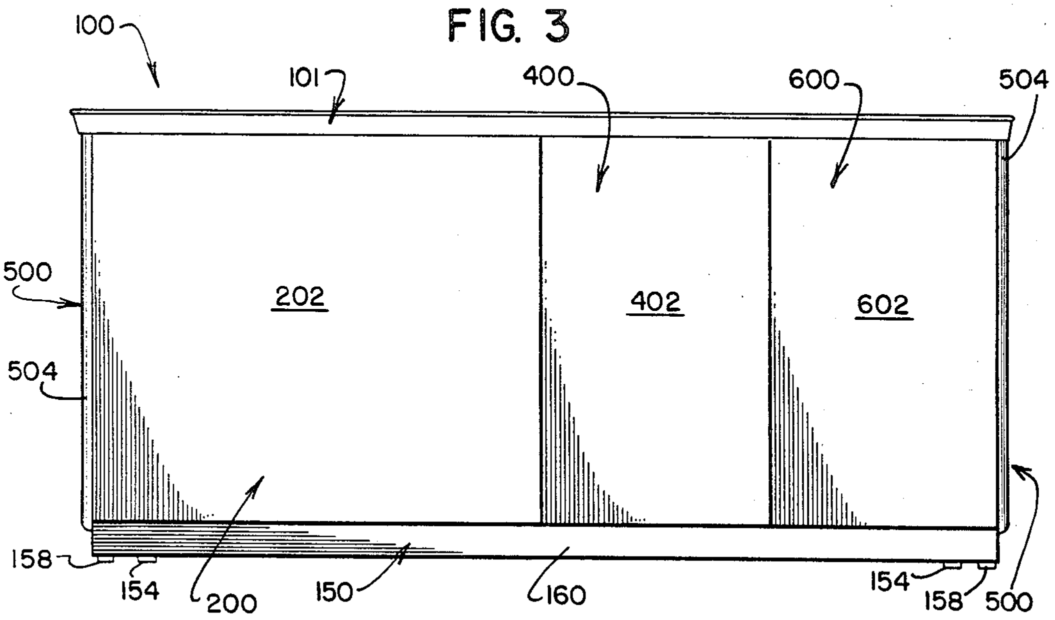
FIG. 3 is a rear elevational view of the storage assembly of FIGS. 1 and 2.
Figure 4:
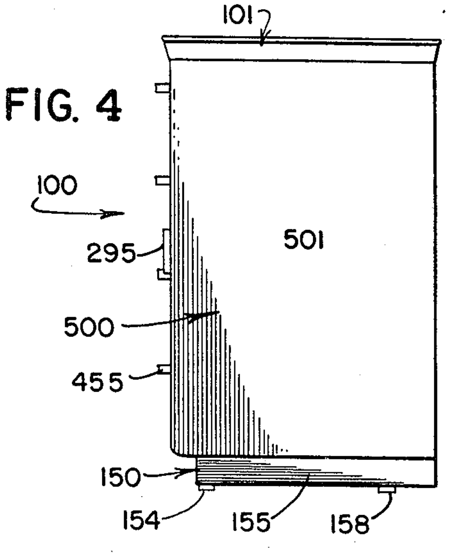
FIG. 4 is an end elevational view of the storage assembly of FIGS. 1 to 3.

Referring now to the drawings, and particularly to FIGS. 1 to 4 thereof, there is illustrated a storage assembly or backbar 100 made in accordance with and embodying the principles of the present invention. The storage assembly 100 includes a top 101 and a base 150 between which are disposed three storage units, more specifically, a cabinet or bookcase 200 provided with sliding doors, a pedestal 400 with four drawers therein, and a cabinet 600 provided with a swinging door. Each of the storage units 200, 400 and 600 is firmly secured to the top 101 and is also firmly secured to the base 150, thereby to provide an integrated unitary storage assembly 100. There further are provided finishing end panels 500 on either end of the storage assembly to improve the appearance thereof.

The details of the construction of the top 101 will now be described with particular reference to FIG. 5 to 9 of the drawings. As may be best seen in FIGS. 6 to 8, the top 101 includes a generally flat top plate 102 that is formed of sheet metal and is generally rectangular in shape, the corners thereof being rounded, the periphery of the top plate 102 being essentially the same as the periphery of the top 101. Disposed beneath the top plate 102 and extending around the periphery thereof is an edging 103 also formed of sheet metal, a substantially flat piece of sheet metal having been deformed to provide an attachment flange 104, a side flange 105, a mounting flange 106, a bottom flange 107 and an upturned flange 108. More specifically, the attachment flange 104 is disposed against the underside of the top plate 102 but is spaced inwardly with respect to the outer edge thereof, the outer edge of the attachment flange 104 carrying thereon the mounting flange 106 which is offset downwardly away from the underside of the top plate 102 and extends outwardly slightly beyond the outer edge thereof. As illustrated, the side flange 105 is integral with the mounting flange 106 and depends therefrom and extends slightly inwardly toward the center of the top plate 102, the flange 105 making an angle of for example 75° with respect to the mounting flange 106. The bottom flange 107 is disposed on the lower edge of the side flange 105 and extends inwardly substantially parallel to the flanges 104 and 106 and carries on the inner end thereof the upturned flange 108 which extends upwardly toward the top plate 102 and is disposed substantially normal thereto and to the bottom flange 107. Preferably the edging 103 is formed as two pieces secured to the top plate 102 by welding at the attachment flange 104, the abutting edges of the edging 103 being located substantially at the midpoints of the shorter top sides and also being welded to form seams therebetween.

Also disposed on the underside of the top plates 102 is a reinforcing sheet 110 formed from a substantially flat piece of sheet metal bent to provide attachment portions 111, ribs 112 having side walls 113, and connecting portions 114 at the periphery thereof. The attachment portions 111 are disposed toward the underside of the top plate 102, there being a body of mastic 115 applied therebetween, the preferred mastic being a heat curing mastic sold under the trademark "Presstite No. 719." The attachment portions 111 are further connected to the top plate 102 by welding as at 116, the heat from the welding operation curing the mastic whereby both the mastic 115 and the welds 116 serve to interconnect the attachment portions 111 and the top plate 102 to provide a firm connection therebetween, the mastic serving to deaden sound transmission therebetween. The side walls 113 depend downwardly from the attachment portion 111 to form the ribs 112 which are spaced from the underside of the top plate 102. The connecting portions 114 are offset from the underside of the top plate 102 where necessary to accommodate therebetween portions such as the attachment flanges 104 on the edging 103, the three layers mentioned being connected by welding as at 116.

Almost mounted beneath the top 102 are two longitudinally extending and substantially parallel and spaced apart mounting channels 120, each mounting channel 120 including a longitudinally extending main wall 121 and a pair of depending side flanges 122 carrying on the lower ends thereof respectively inturned holding flanges 123. As will be explained in detail hereinafter, all of the storage units 200, 400 and 600 are mounted upon the top 101 by means of the mounting channels 120.

Disposed on the upper surface of the top plate 102 is a covering 125, preferably formed of a synthetic organic resin, the preferred materials being those sold under the trademarks "Textolite," "Micarta" and "Formica." An adhesive is applied both to the upper surface of the top plate 102 and to the lower surface of the covering 125 to provide a good bond therebetween, the preferred adhesive being a synthetic rubber adhesive of the type such as that sold under the trademark "D-500" by the Armstrong Cork Company, the two parts being oven heated to about 200° F. to drive off the volatile ingredients in the adhesive. The outer edge of the covering 125 extends slightly beyond the outer edge of the top plate 102, the upper outer corner being slightly beveled as at 126.

Figure 6:
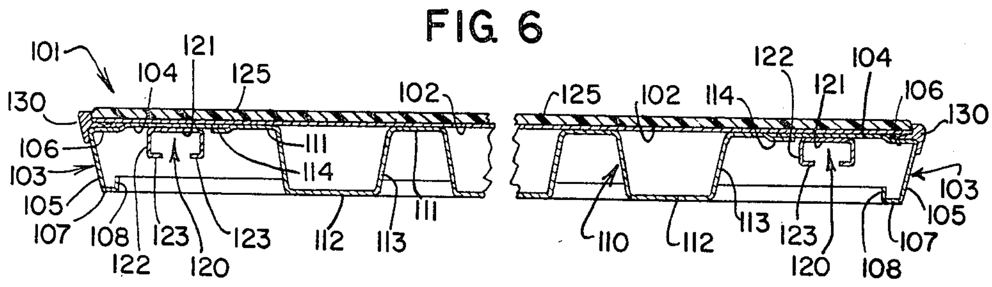
FIG. 6 is an enlarged fragmentary view in vertical section through the top of FIG. 5 along the line 6—6 thereof.
Figures 7, 8:
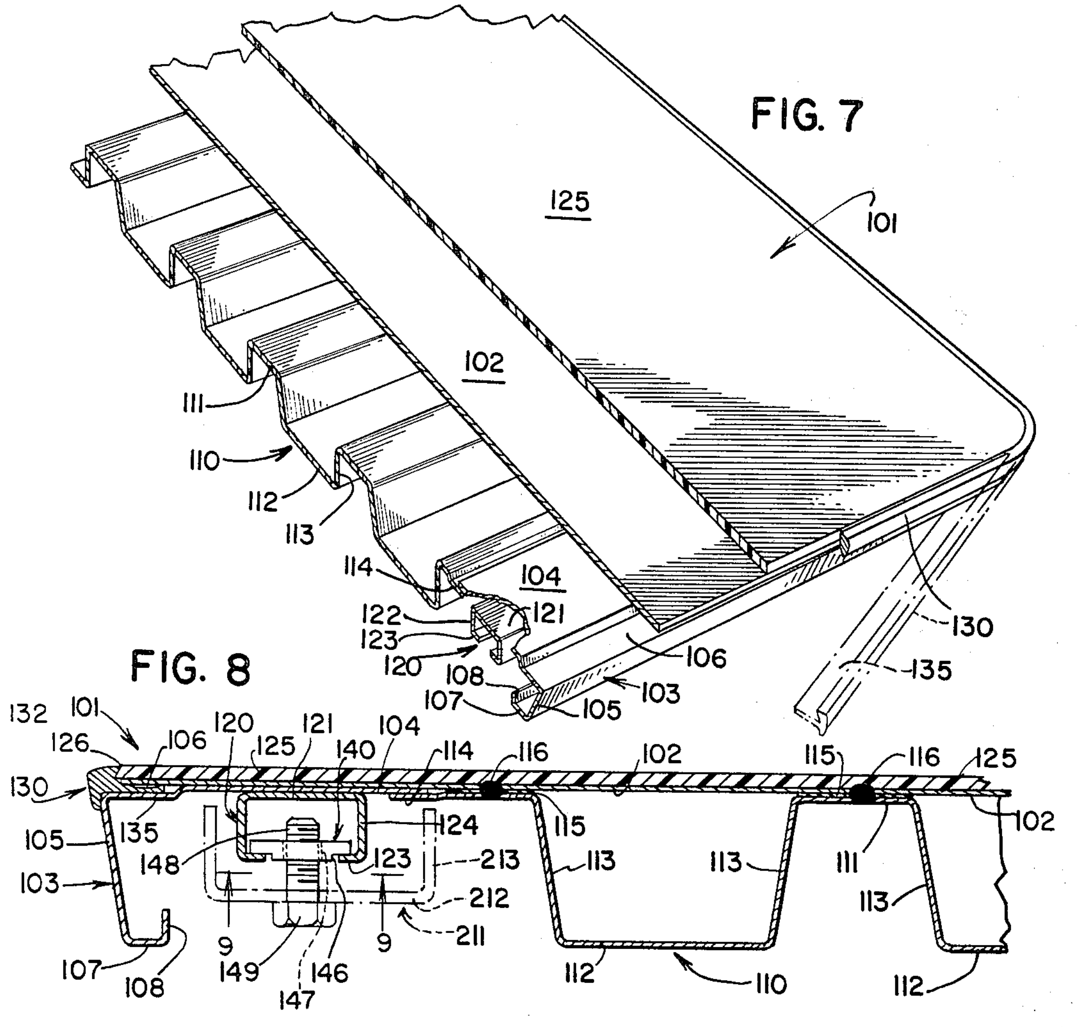
FIG. 7 is a further enlarged perspective view with certain portions broken away of one corner of the top of FIG. 6 and illustrating additional features of construction thereof.
FIG. 8 is a further enlarged view of the lefthand portion of FIG. 6 and further illustrating the attachment of a storage unit to the mounting channel on the top.

To complete the top 101, a decorative trim 130 is provided therearound, the trim 130 comprising a length of extruded aluminum metal including a decorative body 131 having a rounded or curved outer surface 132 extending from adjacent to the upper surface of the covering 125 and downwardly below the upper edge of the edging 103 and terminating in a bottom edge 133. Integral with the body 131 is a neck 134 from which extends a mounting tongue 135, the tongue 135 being concavely curved as viewed from the top and being resiliently gripped between the lower surface of the top plate 102 the upper surface of the mounting flange 106. As is diagrammatically illustrated by the dashed line portion of the trim 130 in FIG. 7, the trim 130 is installed upon the top 101 by progressively urging the mounting tongue 135 into the space defined between the outer edge of the top plate 102 and the mounting flange 106 on the edging 103. Prior to installation, the mounting tongue 135 has a curvature such that the thickness thereof as viewed in FIGS. 6 and 8 is greater than the space between the top plate 102 and the flange 106, whereby the mounting tongue 135 must be resiliently deformed upon insertion into that space, whereby the mounting tongue 135 is pressed between the lower surface of the top plate 102 and the upper surface of the mounting flange 104. The neck 134 also accommodates a small amount of movement between the trim body 131 and the mounting tongue 135, thereby to accommodate slight variations in the abutment between the body 131 and the covering 125, preferably the body 31 having an inwardly directed sharp edge that bears into the cover 125 slightly below the upper surface thereof at the bevel 126.

Figure 9:
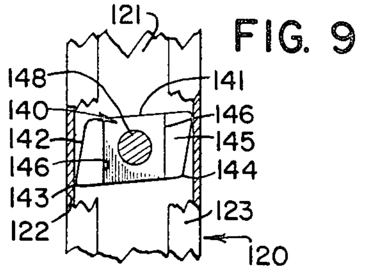
FIG. 9 is a fragmentary view along the line 9—9 of FIG. 8 with certain portions broken away.
Figure 10:
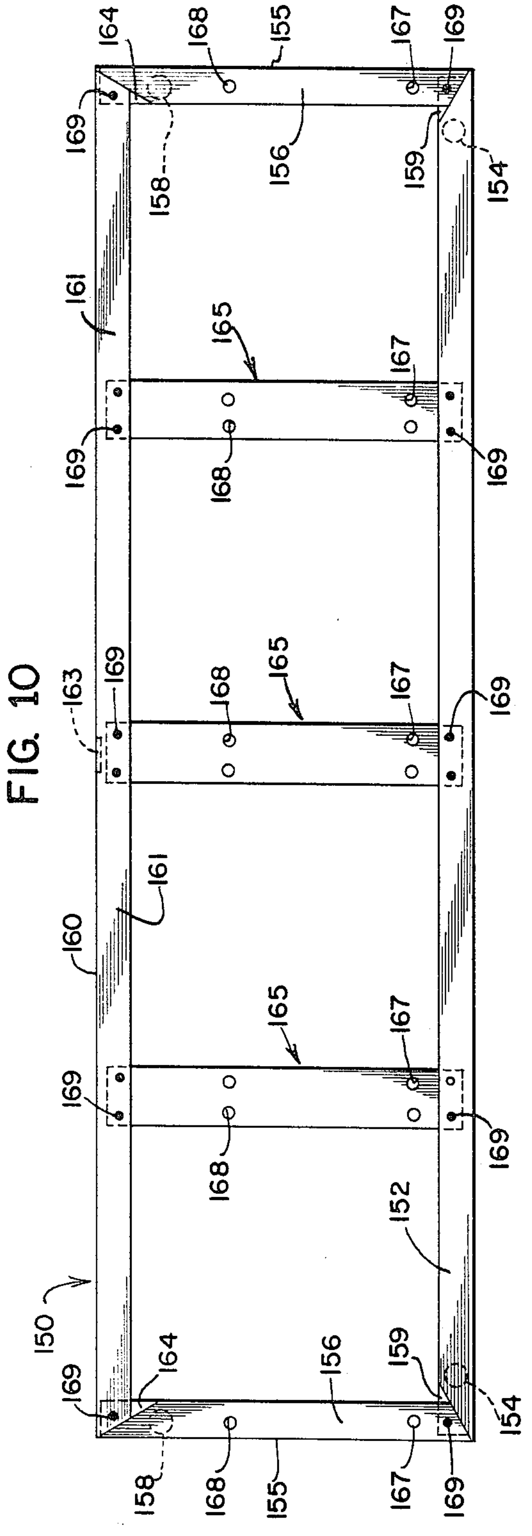
FIG. 10 is a plan view of the base forming a part of the storage assembly of FIGS. 1 to 4.
Figure 11:
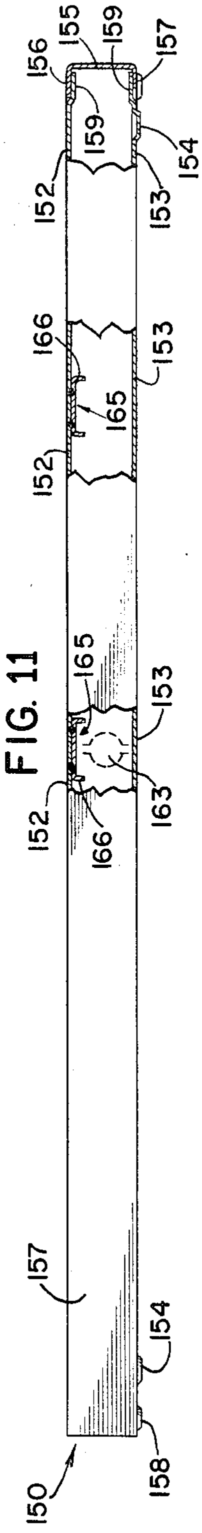
FIG. 11 is a front elevational view with certain portions broken away of the base of FIG. 10.
Figure 12:
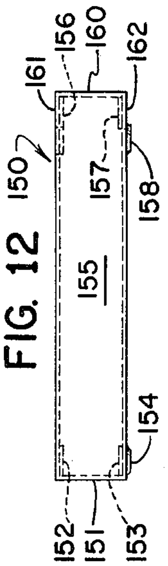
FIG. 12 is an end view of the base of FIGS. 10 and 11.

As has been mentioned heretofore, all of the storage units combining to form the storage assembly 100 are secured to the top 101 through the mounting channels 120 on the underside thereof. There is illustrated in FIGS. 8 and 9 of the drawings the details of the channel 120 and a nut 140 particularly useful for engagement with bolts used in securing the storage units to the top 101. It will be understood that the nuts 140 disposed within the channel 120 are not generally accessible to the workmen during assembly with the associated bolts. As is best seen in FIG. 9, the nut 140 has the outline or a rhombus having parallel longer sides 141 and parallel shorter sides 142 connected by rounded acute corners 143 and rounded obtuse corners 144. As illustrated, the distance between the sides 141 is slightly less than the distance between the inner edges of the flanges 123, whereby the nut 140 can be inserted therebetween at any point therealong, and the corners 143 are adapted to engage the side flanges 122 of the mounting channels 120 to limit the rotation of the nut 140 with respect thereto. The underside of the nut 140 also has the outer ends cut away as at 145 to provide edges 146 spaced apart a distance slightly less than the distance between the inner edges of the flanges 123, whereby the edges 146 depend downwardly along the adjacent inner edge of the associated holding flange 123 to provide abutment therewith when necessary. Disposed essentially centrally the nut 120 is a threaded opening 147 threadedly to receive therethrough a threaded shank 148 of a bolt 149 as illustrated.

Referring now to FIGS. 5, 10, 11 and 12 of the drawings, the details of construction of the base 150 will be described. As illustrated, the base 150 is essentially rectangular in shape and is formed from a front frame member 151 and a rear frame member 160 that are suitably interconnected as by welding. The front frame member 151 is more particularly U-shaped and has a pair of integral side frame members 155 at either end thereof disposed substantially normal thereto and extending rearwardly therefrom. The front frame member 151 further has an integral upper flange 152 and an integral lower flange 153 extending rearwardly therefrom and substantially parallel to each other. The lower flange 153 further has a pair of feet 154 formed thereon adjacent to the outer ends of the front frame member 151 and extending downwardly therefrom to support the base 150 upon an underlying support surface. The side frame members 155 likewise have upper flanges 156 on the upper edges thereof and lower flanges 157 on the lower edges thereof extending normal to the associated side frame member 155 and substantially parallel to each other. Each of the lower flanges 157 has thereon adjacent to the rear end thereof a downwardly extending embossment providing a foot 158. In order to further rigidify the base 150, the top flange 152 is connected to the adjacent top flanges 156 and the lower flange 153 is connected to the adjacent lower flanges 157. To this end, the outer ends of the upper flange 152 are offset downwardly as at 159 so that the upper flanges 156 can extend thereover and the lower flange 153 is likewise offset upwardly so that the lower flanges 157 can extend thereover. Further, the overlapping portions of the flanges 152 and 156 and the overlapping portions of the flanges 153 and 157 are interconnected such as by welding at 169.

The rear frame member 160 likewise has an upper flange 161 and a lower flange 162 thereon disposed parallel to each other and extending forward and overlapping the flanges 156 and 157 on the side frame members 155. More specifically, the upper flanges 156 are offset downwardly as at 164 to receive the adjacent ends of the upper flange 161 and the lower flanges 157 are offset upwardly to receive in overlapping relationship the adjacent end of the lower flange 162, the flanges in the overlapping portions being suitably connected as by welding at 169. In order further to rigidify the base 150, a plurality of braces 165 has been provided, three of the braces 165 having been illustrated and disposed substantially equidistantly along the length of the base 150 and extending between the front frame member 151 and the rear frame member 160. Each of the braces 165 has a pair of side flanges 166 thereon extending downwardly therefrom and has the outer ends thereof disposed beneath the associated flange 152 or 161, as the case may be, and secured thereto as by welding at 169. Finally, a forward row of openings 167 is provided across the base 150, one of the openings 167 being provided in the lefthand flange 163, a pair of the openings 167 being provided in each of the braces 165 and an opening 167 being provided in the righthand flange 156. A similar row of rear openings 168 is provided across the base 150, one of the openings 168 being provided in the lefthand flange 156, a pair of the openings 168 being provided in each of the braces 165 and one of the openings 168 being provided in the righthand flange 156. Finally, a knockout 163 is provided in the rear frame member 160 substantially centrally thereof for the reception of wiring or the like, if desired, within the base 150.

The details of construction of the righthand storage unit 200 will now be described with special reference to FIGS. 5 and 13 to 20 of the drawings. The storage unit 200 is in the form of a cabinet or bookcase and comprises a body 201 including a substantially rectangular rear wall 202, and a pair of substantially rectangular side walls 203 extending forwardly therefrom and disposed substantially perpendicular thereto and parallel to each other. The upper edge of the rear wall 202 carries a top rear flange 204 and the upper edges of the side walls 203 carry top side flanges 205, the forward edges of the top side flanges 205 being cut out as at 206 for a purpose which will be more fully explained hereinafter. The lower edge of the rear wall 202 carries a bottom rear flange 207 and the lower edges of the side walls 203 carry bottom side flanges 208. The forward edges of the side walls 203 carry inwardly directed front flanges 209 that extend substantially vertically and terminate in rearwardly directed flanges 209*a*.

Disposed at the forward portion of the cabinet body 201 is a front frame 210, the details of construction of which are best illustrated in FIGS. 5 to 13 of the drawings, and from those views it will be seen that the frame 210 is formed of a substantially U-shaped channel 211 having the legs thereof disposed vertically with the upper ends of the legs integrally joined to form the U-shape thereof, the channel 211 including a main wall 212 having a pair of side flanges 213 on the edges thereof. The three lower ends of the U-shaped channel 211 are joined by a bottom channel 214, see FIG. 16 also, the channel 214 including a main wall 217 having an offset portion 218 and a pair of side flanges 219. As may be best seen in FIG. 15, the channel side flanges 213 are provided with outwardly extending welding projections 215 thereon for welding attachment to the side walls 203 (not shown in FIG. 15) and the front frame 210 is further strengthened by means of gusset plates 216 at each of the upper corners thereof. In assembling the side walls 203 to the channel 211, a layer of mastic (not shown) is applied to the inner surfaces of the side walls 203 opposite the projections 215, after which the projections 215 are pressed into the mastic and into contact with the side walls 203, and thereafter the side walls 203 are welded to the projections 215, the heat from the welding together with the heating to set the paint later applied curing the mastic. The resultant bond between the front frame 210 and the side walls 203 is unusually strong and in addition serves to deaden sound transmission therebetween. Further details of this construction are disclosed in the copending application of Kenneth D. Schreyer, Ser. No. 503,157, filed Oct. 23, 1965 for Desk Construction, now Patent No. 3,363,955. It will be seen therefore that the front frame 210 extends upwardly through the cut out portions of the side top flanges 205 with the flanges 209*a* disposed adjacent to the forward surfaces thereof and with the side walls 203 firmly secured thereto both by welding and by the mastic disposed therebetween.

A rear top support 220 is disposed adjacent to the rear end of the cabinet 200 and includes a body 221 having portions extending under the top rear flange 204 and the top side flanges 205 and suitably secured thereto as by welding. The forward edge of the top support 220 disposed between the inner edges of the top flanges 205 is provided with an upstanding front flange 222 disposed substantially normal to the body 221. Disposed in the ends of the body 221 and in the corners of the cabinet 200 are upwardly extending embossments 223 having centrally therein elongated openings 224 oriented diagonally with respect to the rear corners of the cabinet 200, the openings 224 being adapted to receive fasteners for the mounting of the cabinet 200 on the top 101 as will be explained more fully hereinafter.

A bottom wall 230 is also provided in the cabinet 202, the bottom wall 230 having a depending rear flange 231 and depending side flanges 232 integral therewith and both carrying on the lower edges thereof inwardly directed bottom flanges 233 that rest upon the bottom side flanges 208 of the body 201 and are suitably secured thereto as by welding. The forward portion of the bottom wall 230 carries a downturned flange 234 integral with which is a door support flange 235 carrying on the forward edge thereof an upturned flange 236. Finally, there is provided on the forward edge of the bottom wall 230 a front flange 237 extending downwardly and terminating in a rearwardly directed bottom flange 238. As will best be seen in FIG. 16, the bottom wall 230 rests upon the bottom channel main wall 217 whereas the depressed flange 235 rests upon the offset 218 in the main wall 217, the offset flange 235 forming a part of the door track structure as will be described more fully hereinafter.

Figures 16, 17, 18:
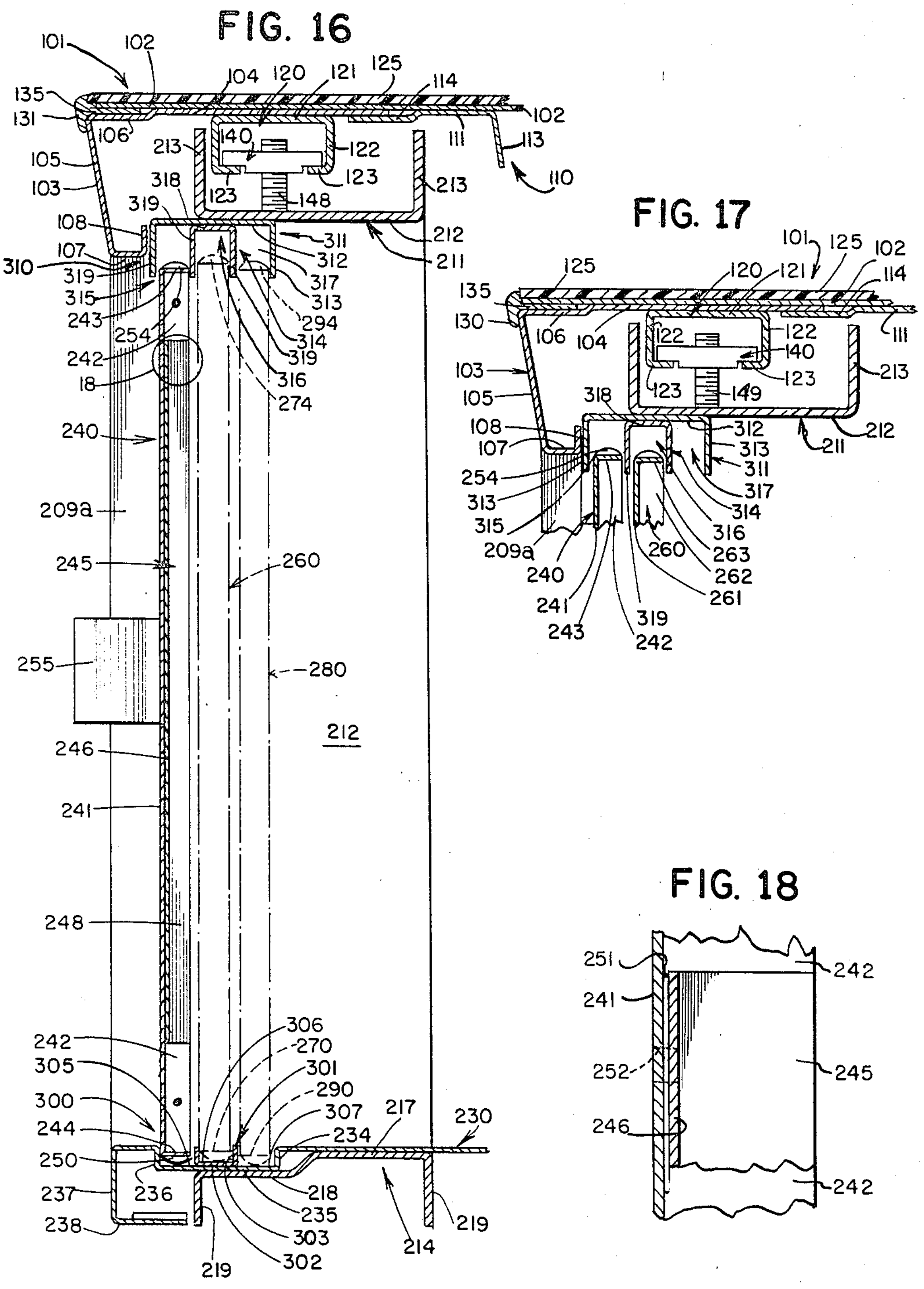
FIG. 16 is a view in vertical section along the line 16—16 of FIG. 15 and with the top in position thereon.
FIG. 17 is a fragmentary view in vertical section along the line 17—17 of FIG. 15 with the top in position thereon.
FIG. 18 is an enlarged view of the portion of FIG. 16 within the circle designated 18.
Figures 19, 20:
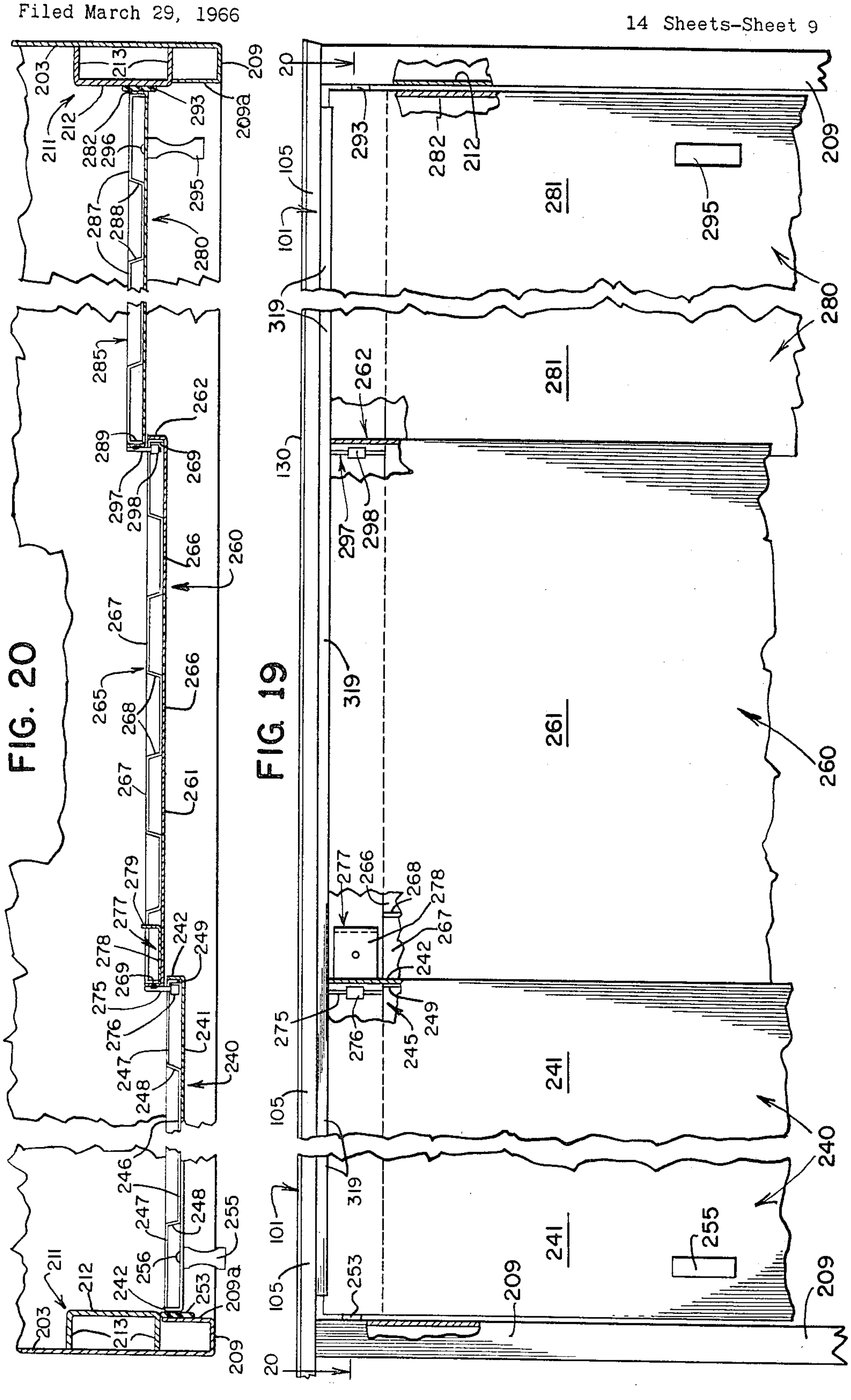
FIG. 19 is a view similar to FIG. 15 but illustrating additional features of the storage unit and particularly the interconnection between the three sliding doors thereof.
FIG. 20 is a fragmentary view in horizontal section along the line 20—20 of FIG. 19.
Figures 21, 22, 23:
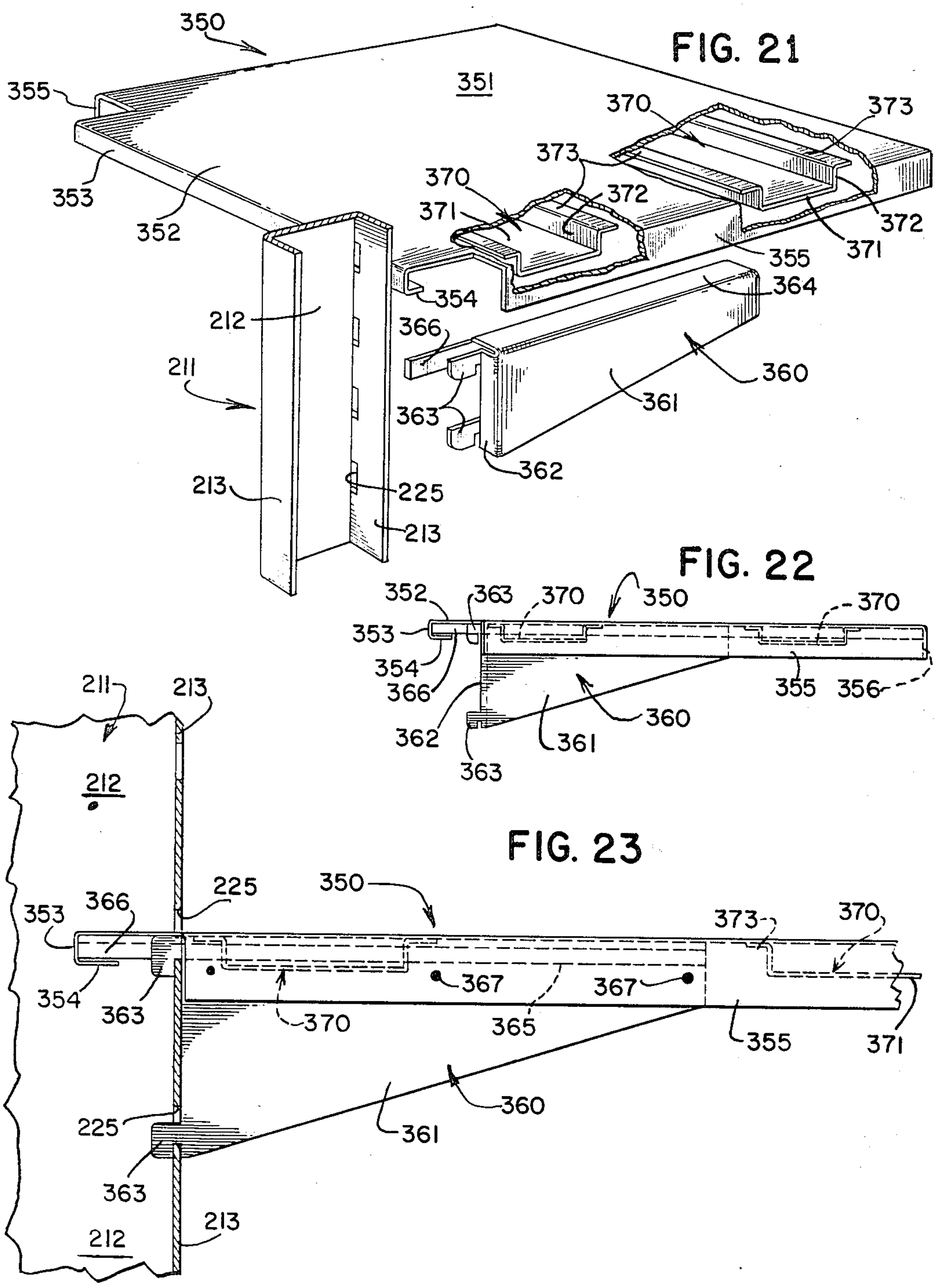
FIG. 21 is an exploded perspective view of a shelf and the supporting structure therefor that is positioned in the storage unit of the FIGS. 13 to 20.
FIG. 22 is a side elevational view of the shelf of FIG. 21 with the parts in the assembled position.
FIG. 23 is an enlarged side elevational view of the shelf of FIGS. 21 and 22 and illustrating the mounting thereof on the associated storage unit frame member.
Figure 24:
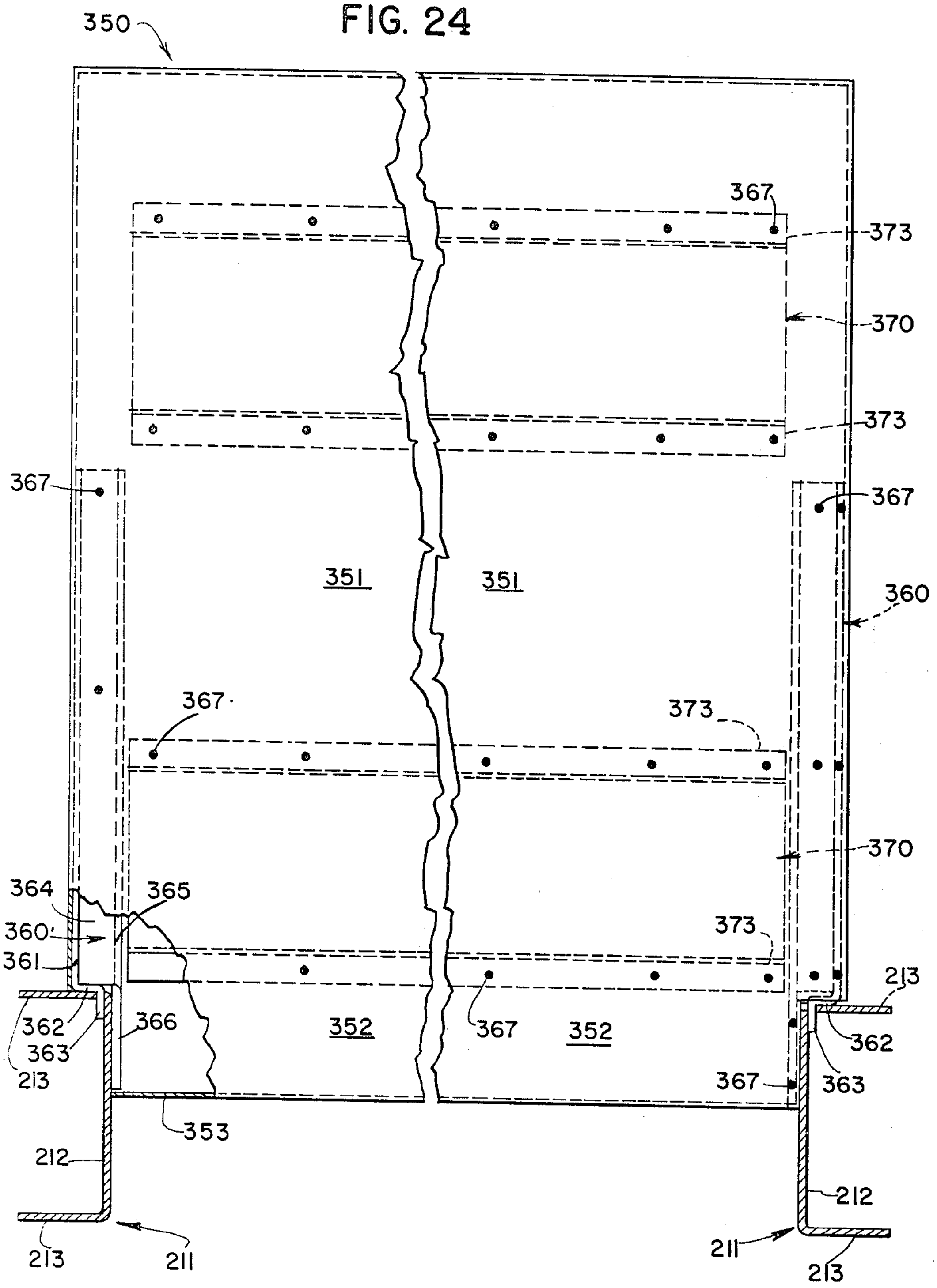
FIG. 24 is a plan view of the shelf with certain portions broken away and showing the mounting thereof on the associated frame members.

The front opening of the cabinet 200 defined by the front frame 210 is provided with a door structure so that this front opening can be closed when desired and selectively opened when required. To this end three sliding doors 240, 260 and 280 have been provided in the front opening and mounted upon lower track structure 300 and upper track structure 310. The details of construction of the doors and the tracks therefor will now be described with special reference to FIGS. 15 to 20 of the drawings. The lefthand door 240 comprises a front panel 241 that is generally rectangular in shape and has a height to fill the space between the track structures 300 and 310 and a width to close approximately one-third of the opening in the front of the cabinet 200. There is provided on each end of the front panel 241 a side flange 242 and on the upper edge thereof a top flange 243 and on the lower edge thereof a bottom flange 244, the four flanges named preferably being joined as by welding at the corners to provide a strong structure. Disposed behind and mounted upon the rear surface of the front panel 241 is a reinforcing sheet 245 that is corrugated in structure including a plurality of longitudinally spaced apart attachment portions 246 between which are disposed reinforcing ribs 247 having rearwardly converging side walls 248. The ends of the reinforcing sheet 245 are provided wtih end flanges 249 disposed within and abutting against the inner surfaces of the side flanges 242 and secured thereto as by welding. As is best illustrated in FIG. 18, a body of mastic 251 is disposed between each of the attachment portions 246 and the rear of the front panel 241 and welds 252 are made therethrough to provide an unusually strong construction having good sound deadening properties. It further will be noted that the vertical extent of the reinforcing sheet 245 is substantially less than the vertical extent of the front panel 241, the reinforcing sheet 245 being arranged substantially centrally in a vertical direction between the top flange 243 and the bottom flange 244 on the front panel 241.

In order to support the door 240 upon the associated track structure for sliding movement therealong, a pair of lubric glides has been provided on the bottom flange 244, the lower glides being designated by the numeral 250 and being preferably formed of a synthetic organic resin, such as a nylon resin. The lefthand side flange 242 is also provided with a pair of vertically spaced apart resilient bumpers 253 extending therefrom and in position to engage the adjacent flange 209*a* to cushion movement of the door 240 to the fully closed position thereof. There also is provided on the top flange 243 a pair of longitudinally spaced apart upper glides 254, also formed of a lubric material such as nylon resin, and adapted to engage braking surfaces as will be described more fully hereinafter. Mounted on the forward surface of the front panel 241 is a pull 255 extending essentially vertically, disposed substantially midway of the vertical extent of the door 240 and secured thereto by screws 256 extending through aligned openings in the front panel 241 and into the rear of the pull 255.

The center door 260 is formed generally like the door 240 and includes a front panel 261 having rearwardly directed side flanges 262 on the side edges thereof, a rearwardly directed top flange 263 on the upper edge thereof and a rearwardly directed bottom flange on the bottom edge thereof, the several flanges named being preferably joined as by welding to provide a strong unitary structure. A corrugated reinforcing sheet 265 is provided on the rear surface of the front panel 261 disposed substantially centrally thereof and extending between the side flanges 262. The reinforcing sheet 265 includes a plurality of longitudinally spaced apart attachment portions 266 that are oriented generally vertically and are joined by ribs 267 having rearwardly converging side walls 268. Provided on the ends of the reinforcing sheet 265 are end flanges 269 that are disposed within the side flanges 262 and are secured thereto as by welding. Disposed between the attachment portions 266 and the rear surface of the front panel 261 are bodies of mastic (not shown) through which welds are made to provide a strong structure having good sound deadening properties.

In order to mount the door 260 on the associated track structure for free sliding movement with respect thereto, a pair of longitudinally spaced apart lower glides 270 has been provided on the bottom flange 264 and a pair of longitudinally spaced apart upper glides 274 has been provided on the top flange 263, the glides 270 and 274 being formed of a lubric material such as synthetic organic plastic resin, the preferred resin being a nylon resin. Mounted on the lefthand end of the door 260 is a pair of forwardly extending pick-up arms 275 secured as by welding to the associated side flange 262 and being disposed so as to extend into the rear of the door 240 respectively above and below the reinforcing sheet 245 thereof for engagement with the inner surface of the adjacent side flange 242 which provides cooperating abutment surfaces therefor. In order to cushion the engagement between the doors 240 and 260, the pick-up arms 275 are provided with resilient bumpers 276, formed for example of rubber. There also is provided on the rear of the front panel 261 a pair of pick-up brackets 277 disposed respectively above and below the reinforcing sheet 265 and each including an attachment flange 278 connected as by welding to the front panel 261 and an integral abutment flange 279 extending rearwardly beyond the rearmost portion of the door 260. The righthand door 280 is also formed like the door 240 and includes a generally rectangular front panel 281 having a pair of rearwardly directed side flanges 282 on the side edges thereof, a rearwardly directed top flange 283 on the upper edge thereof and a rearwardly directed bottom flange 284 on the lower edge thereof, all of the flanges named being connected as by welding to provide a strong unitary structure. Mounted on the rear surface of the front panel 281 is a corrugated reinforcing sheet 285 extending between the side flanges 282 and generally centered vertically but having a vertical extent less than that of the front panel 281. The reinforcing sheet 285 includes a plurality of longitudinally spaced apart vertically extending attachment portions 286 joined by the ribs 287 having rearwardly converging side walls 288, the ends of the reinforcing sheet 285 being provided with end flanges 289 that fit within the side flanges 282 and are secured thereto as by welding. Disposed between the attachment portions 286 and the rear surface of the front panel 281 are bodies of mastic (not shown) through which welds are made to secure the reinforcing sheet 285 to the front panel 281, thus to provide a strong lightweight structure having good sound deadening properties.

In order to mount the door 280 upon the associated track structure, a pair of longitudinally spaced apart lower glides 290 has been provided on the bottom flange 284 and a pair of longitudinally spaced apart upper glides 294 has been provided upon the upper flange 283, the glides 290 and 294 being formed of a lubric material such as a synthetic organic plastic resin, the preferred material being a nylon resin. The righthand side flanges 282 is provided with a pair of vertically spaced apart resilient bumpers 293 thereon, formed for example of rubber, and adapted to abut against the adjacent channel main wall 212 to cushion the movement of the door 280 to the closed position thereof. There further is provided on the front surface of the front panel 281 a pull 295 secured thereto by a pair of screws 296 extending through aligned openings in the front panel 281 and into openings in the rear of the pull 295. The pull 295 is disposed to the right as viewed from the front and adjacent to the side flange 282 that carries the bumpers 293. Attached to the lefthand side flange 282 and extending forwardly therefrom is a pair of pick-up arms 297 disposed adjacent to the upper and lower edges, respectively, of the door 280. The portions of the pick-up arms 297 disposed forwardly of the door 280 carry bumpers 29 that are disposed in the rear of the door 260 to engage abutment surfaces provided by the righthand side flange 262 and the abutment flanges 279. In this regard it is pointed out that the pick-up arms 297 are disposed respectively above and below the reinforcing sheet 265 on the door 260.

The doors 240, 260 and 280 are mounted for sliding movement in a lower track structure 300 and an upper track structure 310. As may be best seen in FIG. 16, the lower track structure 300 is provided by the door support flange 235 in the bottom wall 230 and the flanges 234 and 236 on either side thereof, there further being provided a channel 301 centrally of the support flange 235 and extending the length thereof. The channel 301 includes a main wall 302 suitably secured as by welding to the flange 235 and having extending upwardly from the longitudinally extending edges thereof side flanges 303. The flanges 238 and the adjacent side flange 303 cooperate to provide a front track 305, the side flanges 303 cooperate to provide a middle track 306 and the flange 234 and the adjacent side flange 303 combine to provide a rear track 307. The upper track structure 310 is disposed vertically above the lower track structure 300 and includes an outer channel 311 extending along the top of and within the front frame 210 and terminating at a point spaced from the inner sides of the channel 211, all as may be best seen in FIG. 16. The outer channel 311 comprises a main wall 312 that extends the length of the upper track structure 311 and is suitably secured as by welding to the front frame 210 and specifically to the main wall 212 thereof. Integral with the longitudinally extending edges of the main wall 312 are depending side flanges 313. Disposed centrally of the main wall 312 is an inner channel 314 including a main wall 318 extending the length of the main wall 312 and having on the longitudinally extending edges thereof a pair of depending side flanges 319. The forward one of the side flanges 313 and the forward one of the side flanges 319 cooperate to provide a front track 315; the side flanges 319 cooperate to provide a middle track 316 and the rear side flange 319 and the rear side flange 313 cooperate to provide a rear track 317.

It will be understood that the lefthand door 240 is disposed in the lower front track 305 and the upper front track 315 and is fundamentally supported upon the flange 235 by means of the lower lubric glides 250; the center door 260 is mounted in the lower middle track 306 and the upper middle track 316 is carried by the main wall 302 and supported thereon by the lower glides 270 thereon; and the righthand door 280 is supported in the lower rear track 307 and the upper rear track 317 and is supported upon the flange 235 by means of the lower glades 290 thereon. When the doors are so arranged, the pick-up arms 275 are disposed in the rear of the door 240 and are positioned respectively above and below the reinforcing sheet 245 thereof to engage either one of the side flanges 242 serving as abutment surfaces therefor. The pick-up arms 297 on the door 280 extend forwardly into the rear of the door 260 respectively above and below the reinforcing sheet 265 thereof in position to engage either the righthand side flange 262 serving as an abutment surface or the abutment flange 279 on the one of the pick-up brackets 277. Because of this arrangement, all of the doors may be moved to the right, for example, by grasping the pull 255 and moving it to the extreme righthand position, and conversely all of the doors can be again returned to a closed position by simply moving the pull 255 to the lefthandmost position thereof, all with a single continuous movement; likewise, all of the doors can be moved to the left by grasping the pull 295 and moving it as far as it will go to the left, and conversely all of the doors can be returned to the closed position thereof by simply moving the pull 295 to the righthandmost position thereof, all with a single continuous movement. More specifically, when the pull 255 is grasped and moved toward the right, the pick-up arms 275 are ultimately engaged by the lefthandmost side flange 242 after which the door 240 and the door 260 are moved as a unit until the pick-up arms 297 engage the abutment flange 279, this occurring just before the righthand side flange 262 would engage the pull 295; all of the doors are now in the righthand position and have been placed therein by a single movement of the pull 255 to the right; it will be understood that the provision of the bumpers 276 and 298 upon the pick-up arms 275 and 297, has cushioned the various contacts among the doors, and the lubric glides have made such movement of the doors quiet and smooth. All of the doors can again be moved to the closed position by simply moving the pull 255 toward the left. In so doing, the pick-up arms 275 are engaged by the righthand side flange 242 after a suitable movement of the door 240 to the left, after which the doors 240 and 260 are moved as a unit until the righthand flange 262 contacts the pick-up arms 297 and the bumpers 253 engage the side flange 209*a*. All of the doors in a like manner can be moved to the left by grasping the pull 295 and moving it to the left. In such action, the pick-up arms 297 after a suitable movement of the door 280 contact the abutment flange 279 and thereafter the doors 280 and 260 move as a unit until ultimately the pick-up arms 275 strike the lefthand side flange 242 on the door 240; all of the doors are now in the lefthand position and have been placed therein by a single movement of the pull 295 to the left; all of the doors can then be moved to the fully closed position by a single movement of the pull 295 to the right, the pick-up arms 297 engaging the righthand side flange 262 after a suitable movement of the door 280 after which the door 280 and the door 260 move together until the pick-up arms 275 strikes the righthand side flange 242 and the bumpers 293 engage the frame wall 212.

Disposed within the cabinet 200 and extending rearwardly therefrom and supported therein in cantilever fashion is a shelf 350, the mounting and construction of the shelf 350 being best illustrated in FIGS. 5 and 21 to 24 of the drawings. The shelf 350 includes a generally rectangular main panel 351 formed of sheet metal and having integral therewith a forwardly directed forward portion 352 having a width less than that of the main panel 351; preferably the width of the main panel 351 is only slightly less than the distance between the side walls 203 of the cabinet 200 whereas the width of the forward portion 352 is slightly less than the distance between the vertical frame members 211 of the front frame 210. Integral with the forward edge of the forward portion 352 is a depending front flange 353 on the lower edge of which is provided a rearwardly directed bottom flange 354. Each side edge of the main panel 351 has a depending side flange 355 thereon and the rear edge of the main panel 351 also has a depending rear flange 356 thereon, the flanges 355 and 356 being joined as by welding to increase the strength of the shelf 350.

In order to mount the shelf 350 upon the front frame 210, a pair of mounting brackets 360 has been provided, the mounting brackets being identical except that one is the mirror image of the other, whereby only one of the brackets 360 will be described in detail and like reference numerals supplied to like parts of both. The bracket 360 includes a main wall 361 which has a substantially horizontal upper edge and substantially vertically arranged front and rear edges and an upwardly and rearwardly inclined bottom edge. The forward edge has an integral front flange 362 thereon directed inwardly and carrying on the inner edge thereof a pair of vertically spaced apart hooks 363. The hooks 363 are spaced apart and dimensioned such that they will fit into an associated pair of vertically elongated slots 225 provided in an adjacent channel frame member 211, thereby to mount the bracket 360 and the connected shelf 350 thereon. Intgeral with the upper edge of the main wall 361 is an inwardly directed top flange 364 which carries on the inner edge thereof a depending inner flange 365 which has on the forward end thereof an outwardly extending support arm 366 which is disposed against an inner surface of the associated channel 211 when the shelf is in the mounted position thereof, the arm 366 being disposed beneath the adjacent edge of the forward portion 352 and extending forwardly substantially to the front flange 353. The brackets 360 are fixedly secured to the main panel 351 and the forward portion 352 as by welding at the points 367, the side flanges 355 also being welded to the bracket main wall 361. There further is provided for reinforcement purposes a pair of reinforcing channels 370, the channels 370 being disposed on the undersurface of the main wall 351 and being disposed laterally with respect thereto and positioned between the brackets 360. Each of the channels 370 includes a main wall 371 spaced downwardly from the underside of the main panel 351 and having on the longitudinally extending edges thereof upwardly directed side flanges 372. The side flanges 372 extend up to the underside of the main panel 351 and have integral therewith outwardly directed attachment flanges 373. The attachment flanges 373 are secured to the shelf main panel 351 also by welding as at 367. As a result of the described construction, the shelf 350 has a very rigid and strong construction whereby it can readily be mounted upon the front frame 210 and extends rearwardly therefrom and is supported in cantilever fashion thereby, no other support being required therefor. More specifically, the hooks 363 on the brackets 360 engage in an adjacent pair of the slots 225 in the rear edges of the front frame 210. The front flange 362 of each of the brackets 360 bears against the rear side flange 213 of the front frame 210, also thereby to assist in the support of the shelf 350. The support brackets 360 extend rearwardly from the frame 210 and support thereon the main panel 351, the arms 366 extending forwardly to support the forward portion 352. By providing a series of horizontally aligned slots 225 in the front frame 210, the position of the shelf 350 vertically with respect to the front frame 210 can be manually adjusted.

Figure 5:
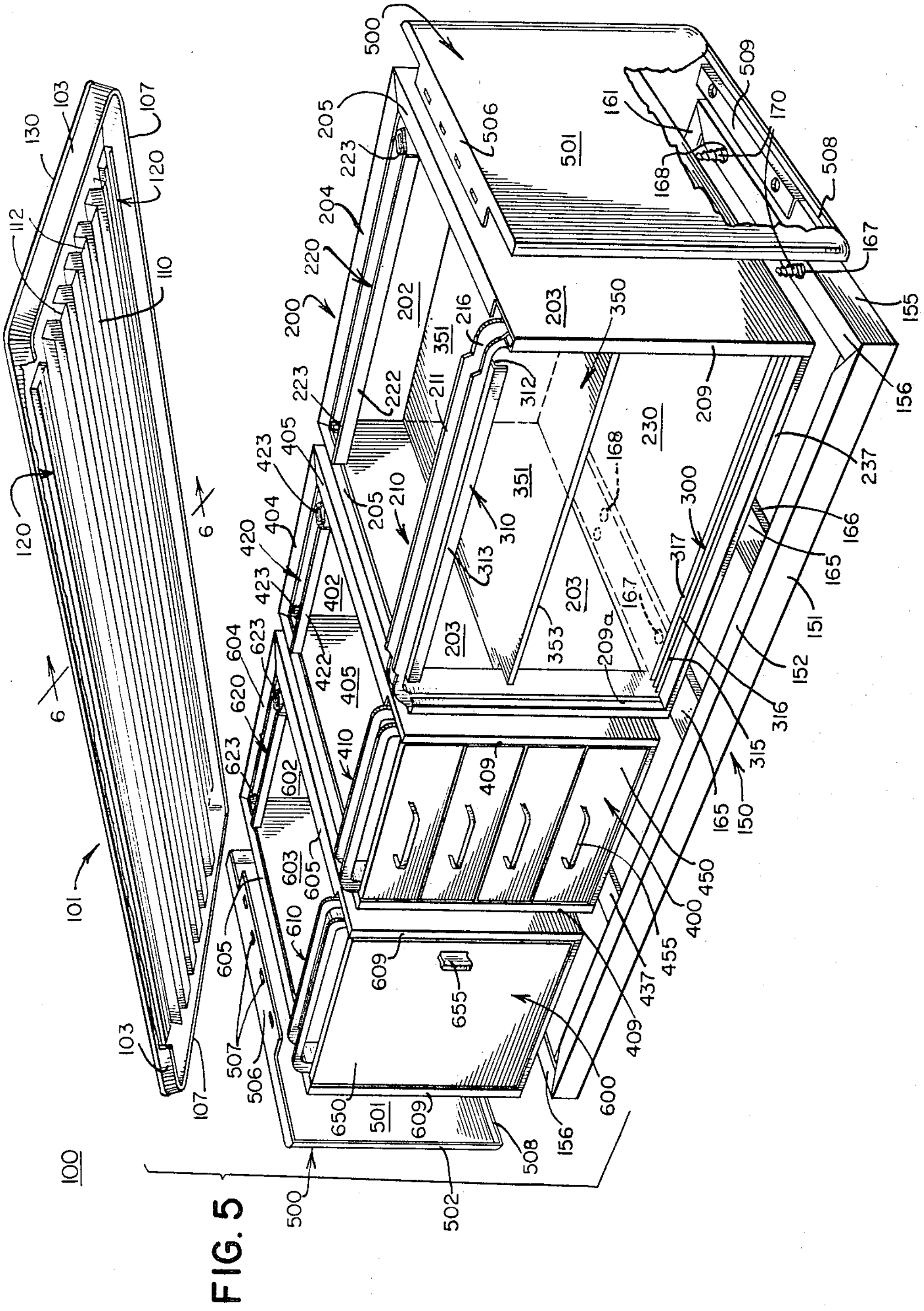
FIG. 5 is an exploded view of the storage assembly of FIGS. 1 to 4 with the three sliding doors removed from the cabinet disposed to the right.
Figure 25:
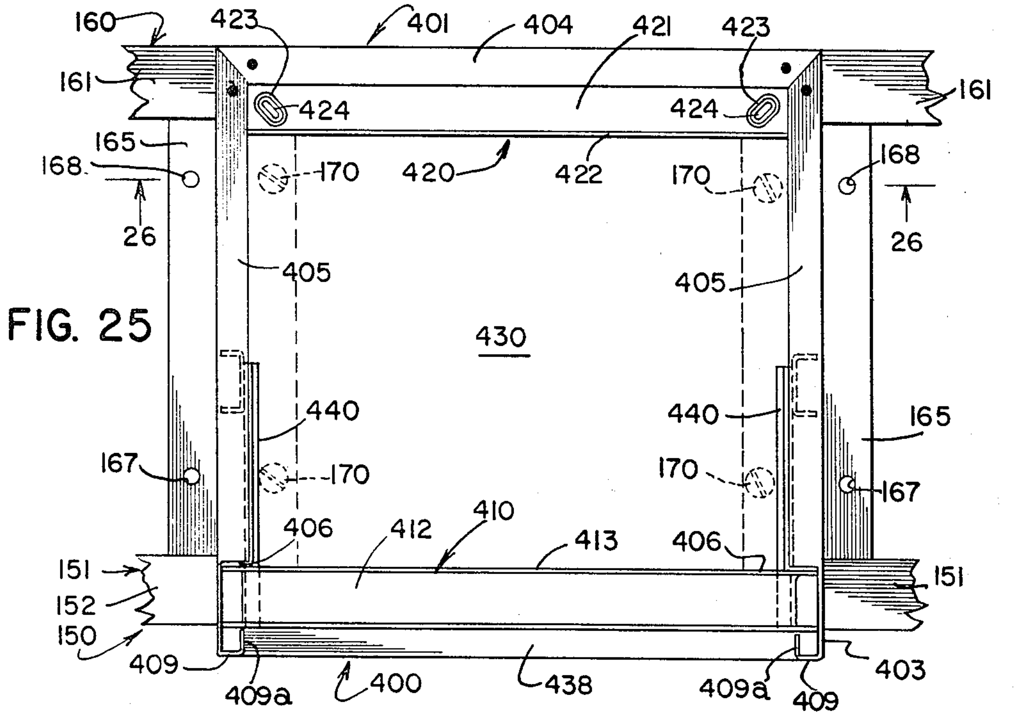
FIG. 25 is a plan view of the center storage unit with the top removed.
Figure 26:
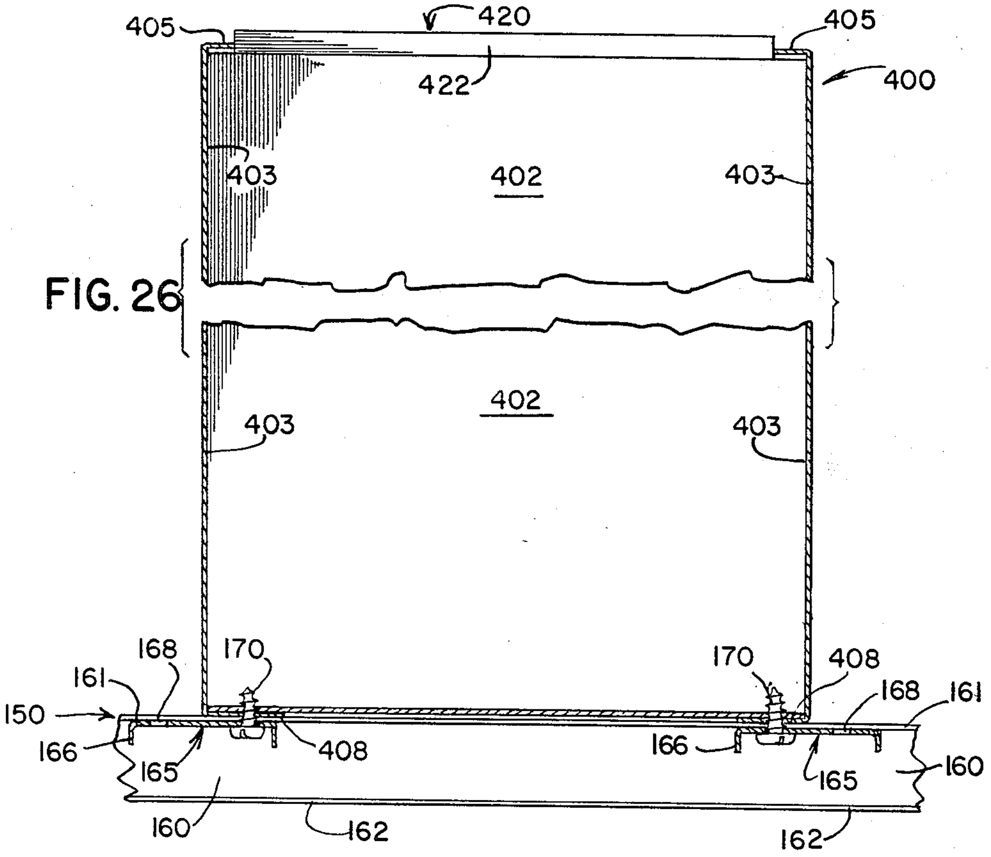
FIG. 26 is a view in vertical section with certain portions broken away along the line 26—26 of FIG. 25.
Figure 27:
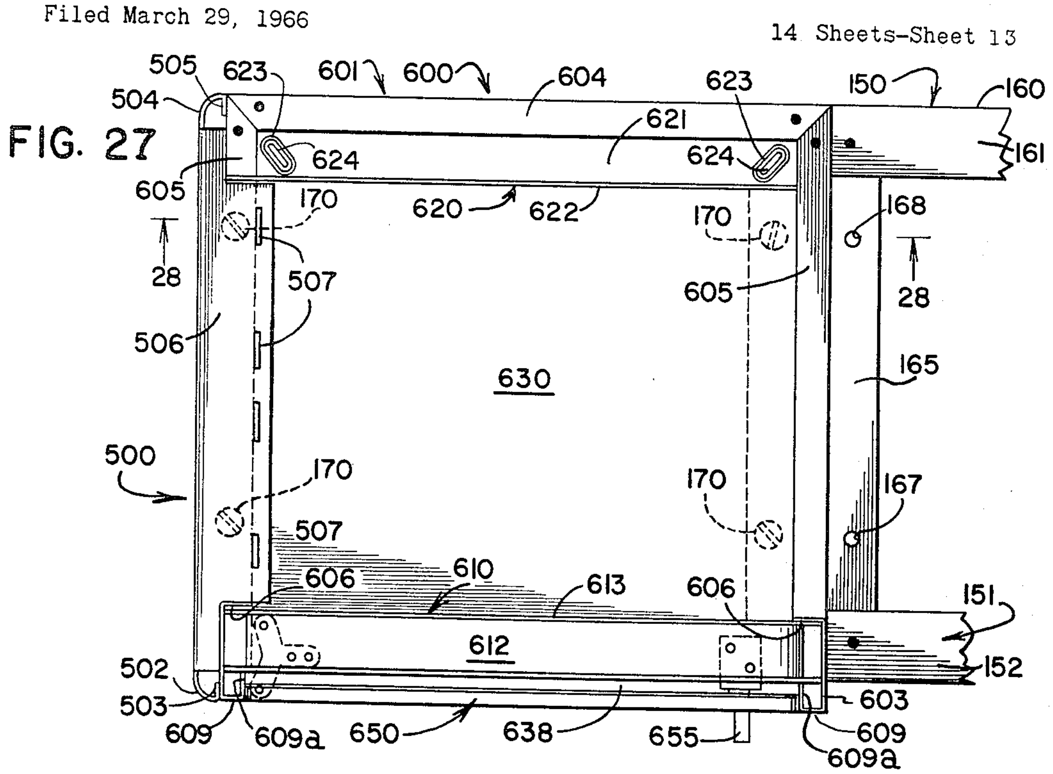
FIG. 27 is a plan view with top removed of the lefthand storage unit.
Figure 28:
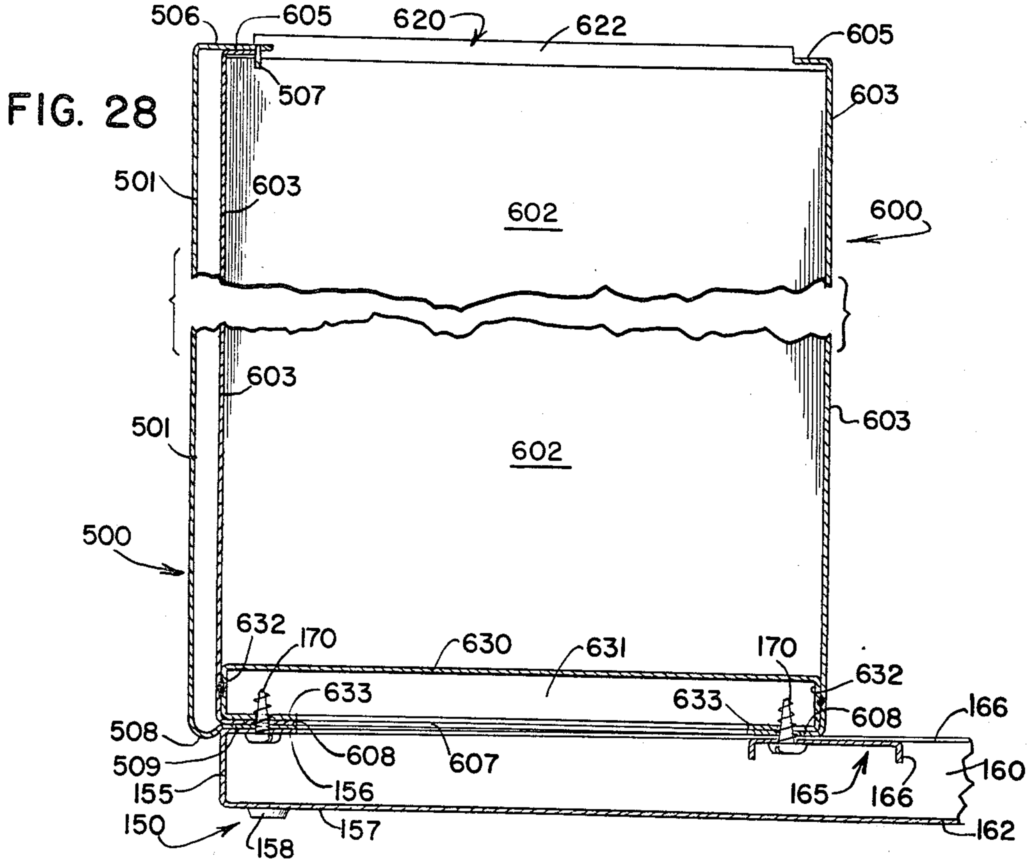
FIG. 28 is a view in vertical section with certain portions broken away through the storage unit of FIG. 27 along the line 28—28 thereof.

Referring now to FIGS. 5, 25 and 26, the details of construction of the storage unit 400 will be described. As illustrated, the storage unit 400 is in the form of a pedestal having mounted therein a plurality of sliding drawers. The pedestal 400 comprises a body 401 including a substantially rectangular rear wall 402, and a pair of substantially rectangular side walls 403 extending perpendicular thereto and parallel to each other. The upper edge of the rear wall 402 carries a top rear flange 404 and the upper edges of the side walls 403 carry top side flanges 405, the forward edges of the top side flanges 405 being cut out as at 406 for a purpose which will be more fully explained hereinafter. The lower edge of the rear wall 402 carries a bottom flange 407 and the lower edges of the side walls 403 carry bottom side flanges 408. The forward edges of the side walls 403 also carry inwardly directed front flanges 409 that extend substantially vertically and terminate in rearwardly directed flanges **409*a***.

Disposed at the forward portion of the pedestal body 401 is a front frame 410, the frame 410 being formed from a channel member extending completely around the front opening in the pedestal body 401, the channel being U-shaped in cross section and including a main wall 412 having a pair of side flanges 413 on the edges thereof extending outwardly therefrom. The frame 410 fits within the forward portion of the body 401 and specifically in the cut out portions 406 of the top side flanges 405 and is secured to the body 401 as by welding. A rear top support 420 is disposed adjacent to the rear end of the pedestal 400 and includes a body 421 having portions extending under the top rear flange 404 and the top side flanges 405 and suitably secured thereto as by welding. The forward edge of the top support 420 disposed between the inner edges of the top flanges 405 is provided with an upstanding front flange 422 disposed substantially normal to the body 421. Disposed in the ends of the body 421 and in the corners of the pedestal 400 are upwardly extending embossments 423 having centrally therein elongated openings 424 oriented diagonally with respect to the rear corners of the pedestal 400, the openings 424 being adapted to receive fasteners for the mounting of the pedestal 400 on the top 101 as will be explained more fully hereinafter. A bottom wall 430 is also provided in the pedestal 400 and is supported on the bottom side flanges 408 of the body 401 and is suitably secured thereto as by welding. Finally, an upwardly directed front flange 437 is provided having a rearwardly directed flange 438 integral with the upper edge thereof. Further details of construction of the pedestal 400 are set forth in the copending application of Kenneth D. Schreyer, Ser. No. 503,157, filed Oct. 23, 1965 for Desk Construction, now Patent No. 3,363,955.

Disposed within the pedestal 400 are four sets of drawer support structures 440 that serve to support a plurality of drawers 450 thereon, four box drawers 450 having been illustrated in the drawings, each of the drawers 450 being provided with a suitable pull 455.

Referring now to FIGS. 5 and 27 to 31, the details of construction of the storage unit 600 will be described. As illustrated, the storage unit 600 is in the form of a pedestal having mounted thereon a swinging door. The pedestal 600 comprises a body 601 including a substantially rectangular rear wall 602, and ap air of substantially rectangular side walls 603 extending perpendicular thereto and parallel to each other. The upper edge of the rear wall 602 carries a top rear flange 604 and the upper edges of the side walls 603 carry top side flanges 605, the forward edges of the top side flanges 605 being cut out as at 607 for a purpose which will be more fully explained hereinafter. The lower edge of the rear wall 602 carries a bottom flange 607 and the lower edges of the side walls 602 carry bottom side flanges 608. The forward edges of the side walls 603 also carry inwardly directed front flanges 609 that extend substantially vertically and terminate in rearwardly directed flanges 609*a*.

Disposed at the forward portion of the pedestal body 601 is a front frame 610, the frame 610 being formed from a channel member extending completely around the front opening in the pedestal body 601, the channel member being U-shaped in cross section and including a main wall 612 having a pair of side flanges 613 on the edges thereof extending outwardly therefrom. The frame 610 fits within the forward portion of the body 601 and specifically in the cut out portions 606 of the top side flanges 605 and is secured to the body 601 as by welding. A rear top support 620 is disposed adjacent to the rear end of the pedestal 600 and includes a body 621 having portions extending under the top rear flange 604 and the top side flanges 605 and suitably secured thereto as by welding. The forward edge of the top support 620 disposed between the inner edges of the top flanges 605 is provided with an upstanding front flange 622 disposed substantially normal to the body 621. Disposed in the ends of the body 621 and in the corners of the pedestal 600 are upwardly extending embossments 623 having centrally therein elongated openings 624 oriented diagonally with respect to the rear corners of the pedestal 600, the openings 624 being adapted to receive fasteners for the mounting of the pedestal 600 on the top 101 as will be explained more fully hereinafter. A bottom wall 630 is also provided in the pedestal 600, the bottom wall 630 having a depending rear flange 631 and depending side flanges 632 integral therewith and both carying on the lower edges thereof inwardly directed bottom flanges 633 that rest upon the bottom side flanges 608 of the body 601 and are suitably secured thereto as by welding. Finally, a front flange 637 is provided having a rearwardly directed flange 638 integral with the upper edge thereof. Further details of construction of the pedestal 600 are set forth in the copending application of Kenneth D. Schreyer, Ser. No. 503,157, filed Oct. 23, 1965 for Desk Construction, now Patent No. 3,363,955.

Figure 29:
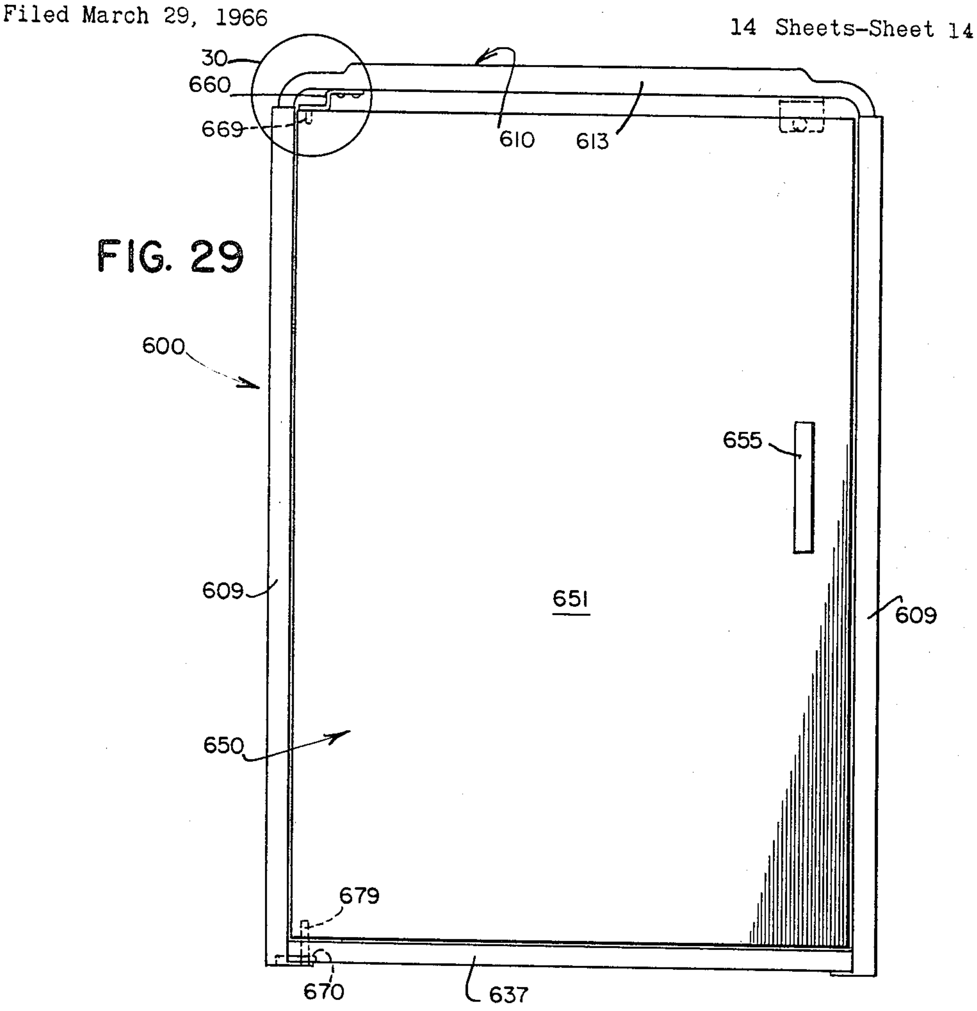
FIG. 29 is a front elevational view of the storage unit of FIGS. 27 and 28.
Figure 31:
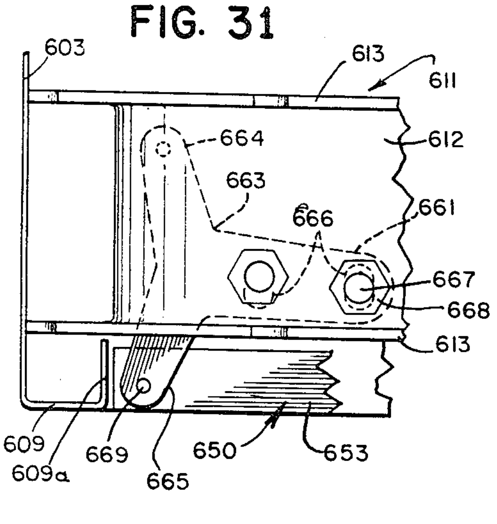
FIG. 31 is a plan view of the portion of the structure illustrated in FIG. 30.
Figure 30:
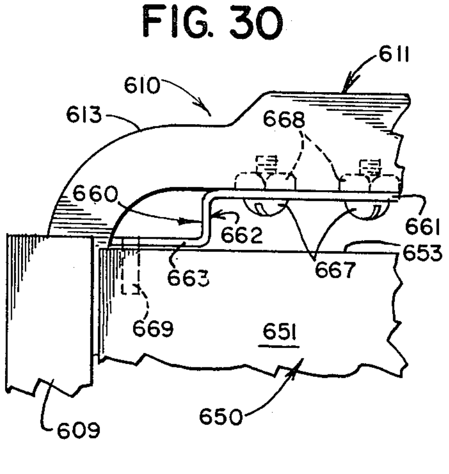
FIG. 30 is an enlarged fragmentary view of the portion of FIG. 29 contained within the circle designated 30.

Additional details of construction of the pedestal 600 and particularly details of the mounting of a door 650 thereon will best be seen by reference to FIGS. 29 to 31. As illustrated in the drawings, the door 650 is hinged on the left as viewed in FIG. 29 within the front frame 610 and surrounded by the flanges 609*a* and 638. The door 650 is formed of a metal outer panel 651 and a metal inner panel connected around the periphery thereof by a metal wall 653, a pull 655 being provided on the outer panel 651 to facilitate opening and closing of the door 650. A quantity of insulating and sound deadening material fills the interior of the door 650. An upper hinge plate 660 is provided to hinge the upper edge of the door 650 to the frame 610, the hinge plate 660 including an attachment flange 661, an offset flange 662 and a Y-shaped hinge flange 663, the flanges 661 and 663 being disposed parallel to each other and perpendicular to the flange 662, the flange 663 having two arms 664 and 665 as is best seen in FIG. 31. A pair of elliptical openings 666 is provided in the support flange 661 to receive therethrough bolts 667 that engage the main wall 612 of the frame 610. Each of the flange arms 664 and 665 carries a downwardly extending hinge post 669, the forwardmost hinge post 669 extending into an opening in the top wall 653 of the door 650 to provide a hinged connection thereto. The other arm 664 on the hinge plate 660 is utilized to hinge the door 650 on the right, if desired. A second hinge plate 670 is provided for hinging the lower edge of the door 650 in the pedestal body 601, the hinge plate 670 being suitably secured as by welding to the bottom wall 630 and having a hinge post 679 extending upwardly therefrom in alignment with the hinge post 669, the hinge post 679 extending into an opening in the lower end of the door 650 to provide a hinged connection therefor.

Figure 13:
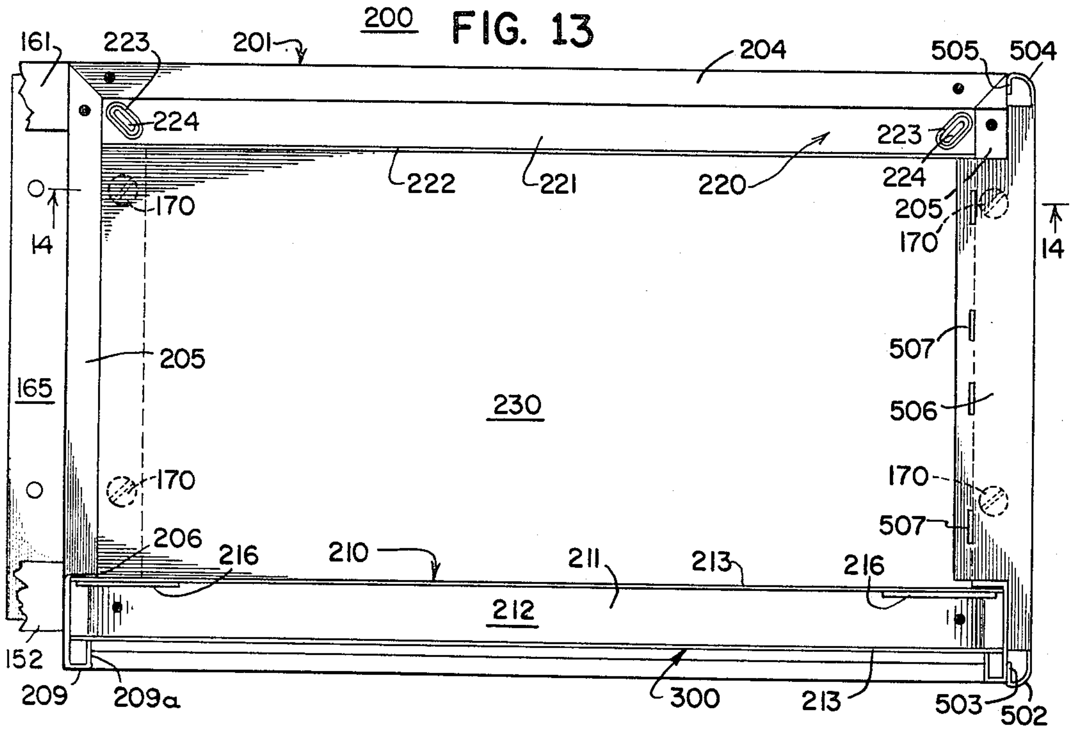
FIG. 13 is a plan view of the rigthhand storage unit mounted upon the base with the top removed.
Figure 14:
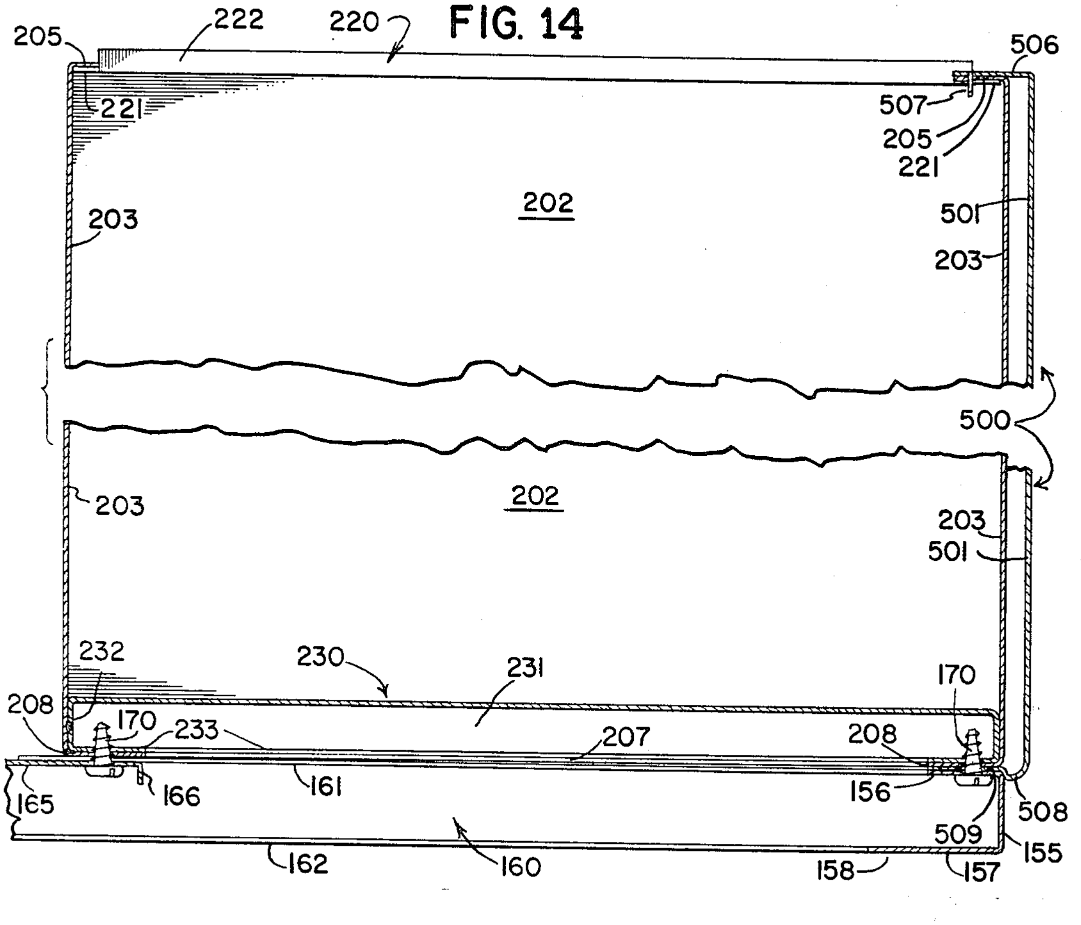
FIG. 14 is a view in vertical section with certain parts broken away along the line 14—14 of FIG. 13.
Figure 15:
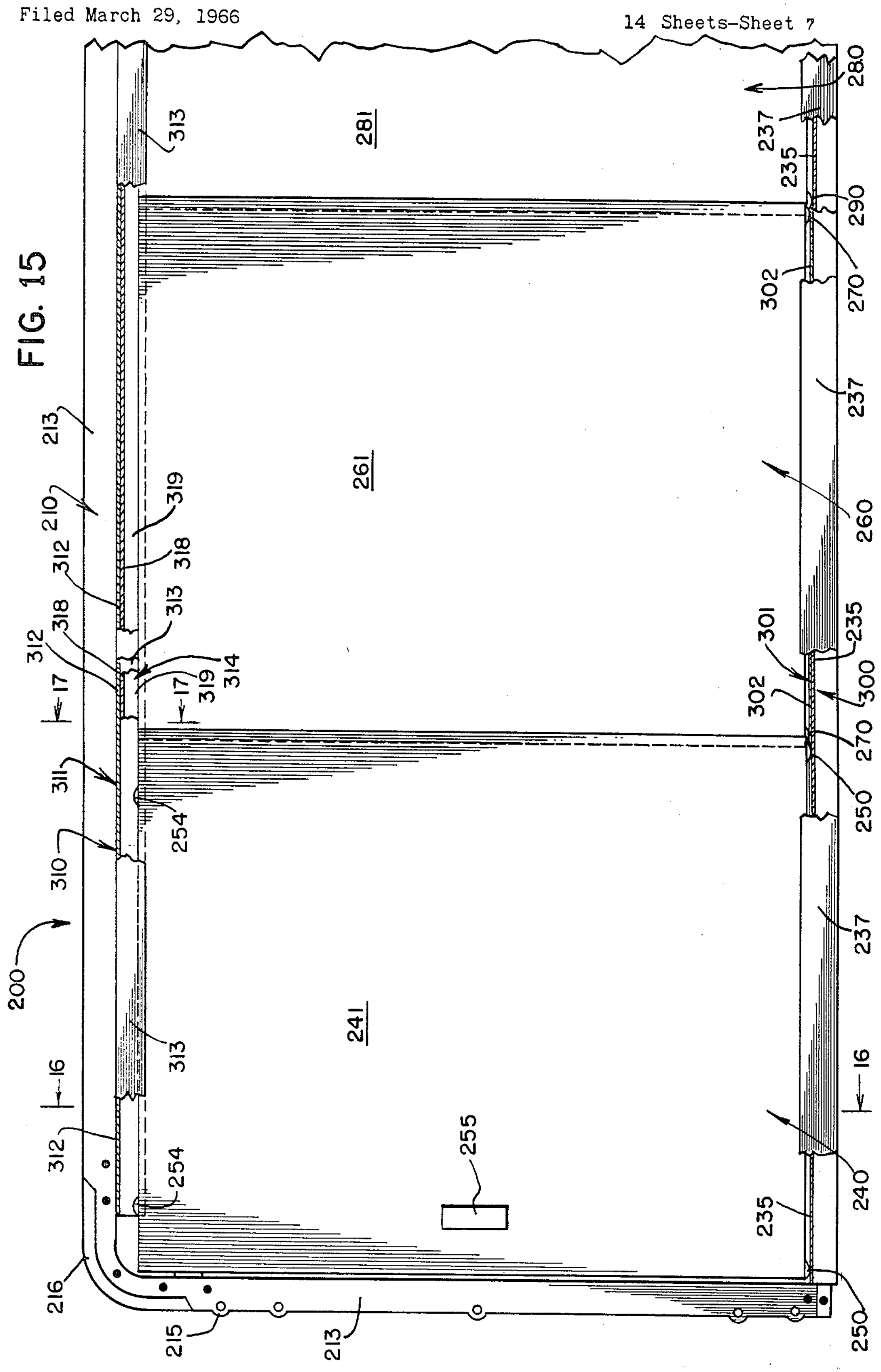
FIG. 15 is an enlarged view with certain portions broken away of the front of the righthand storage unit; the body having been removed therefrom to illustrate the welding projections.

There is provided at either end of the storage assembly 100 a finishing panel 500, details of construction of which are best seen in FIGS. 5, 13 and 14 of the drawings. The finishing panels 500 are formed identical to one another, and accordingly, only one will be described in detail, like reference numerals being applied to like parts of both the finishing panels 500. As illustrated, the finishing panel 500 includes a main wall 501 that is generally rectangular in shape and has a width and height such as to cover the end of the adjacent storage assembly 100. The forward edge of the main wall 501 carries an integral curved side flange 502 thereon that extends inwardly and carries on the inner edge thereof a rearwardly directed flange 503 adapted to be disposed against the adjacent storage unit side wall, such as the side wall 203 as illustrated in FIG. 113. The rear edge of the main wall 501 also carries a curved side flange 504 that has integral with the rear edge thereof a forwardly directed flange 505 which is likewise disposed in use against the adjacent storage unit side wall, such as the side wall 203. The upper edge of the main wall 501 carries an inwardly directed top flange 506 which overlies the adjacent storage unit side top flange such as the side top flange 205 in FIG. 14 and further has formed on the inner edge thereof downwardly directed embossments 507 cut from the top flange 506 and lying against the inner edge of the associated top side flange 205. The lower end of the main wall 501 carries an inwardly directed rounded bottom flange 508 which extends upwardly and terminates in a lateral flange 509 that is disposed on top of the base upper flange 156, the longitudinal extent of the lateral flange 509 being substantially less than the longitudinal extent of the main wall 501 as may be best seen in FIG. 5 of the drawings. In fitting over the base flange 156, the lateral flange 509 also is disposed beneath the side bottom flange of the adjacent storage unit such as the side bottom flange 208 on the cabinet side wall 203 as illustrated in FIG. 14.

It will be seen that each of the storage units 200, 400 and 600 as well as the finishing panels 500 are connected both to the top 101 and the base 150. More specifically, the front mounting channel 120 on the top 101 is received between the side flanges at the top of the front frames 210, 410 and 610 of the storage units 200, 400 and 600, respectively, each of the front frames having openings therethrough which receive the bolts 149 engaging the special nuts 140 disposed in the mounting channel 120, whereby each of the storage units 200, 400 and 600 has the forward end thereof firmly clamped to the front mounting channel 120. Furthermore, the rear mounting channel 120 is disposed above the rear top supports 220, 420 and 620 of the storage units 200, 400 and 600, respectively, and in position such that the bolts 149 extending through the diagonal openings therein are engaged by special nuts 140 disposed in the rear mounting channel 120. As a consequence, the rear end of each of the storage units 200, 400 and 600 can be firmly clamped to the top 101 via the rear mounting channel 120 thereon. Such clamping of the storage units 200 and 600 to the underside of the top 101 likewise clamps the top flanges 506 on the finishing panels 500 in the operative positions thereof.

The bottoms of the storage units 200, 400 and 600 are likewise fixedly connected to the base 150. Referring first to FIGS. 5 and 14, it will be seen that aligned openings are provided in the bottom wall bottom flange 233, the bottom side flange 208, the finishing panel lateral flange 509 and the base upper flange 156, two of such series of openings being provided and receiving therethrough sheet metal screws 170 to clamp together the various members named in a firm connection. A like pair of sets of aligned openings is provided in the lefthand bottom wall bottom flange 233, the bottom side flange 208, and the associated brace 165 to receive therethrough a sheet metal screw 170. In this manner the storage unit 200 is fixedly secured to both the top 101 and the base 150. The storage units 400 and 600 are similarly secured both to the top 101 and the base 150, such securing of the storage unit 600 also firmly connecting the adjacent finishing panel 500 in the operative position thereof, see also FIGS. 25 to 28 of the drawings for additional details of the mounting of the storage units 400 and 600.

It will be understood that a wide variety of storage units may be utilized in the storage assembly 100, and further that the storage units illustrated can be modified and the order thereof on the base 150 changed and rearranged. For example, the order of the storage units on the base 150 can be rearranged so that any one of the three storage units illustrated may be placed in any of the three possible positions thereof upon the base 150 and beneath the top 101. The storage unit 200 further may be modified to omit the shelf 350, if desired, and likewise the doors 240, 260 and 280 may be omitted therefrom. In the storage unit 400, several possible combinations of arrangements of drawers therein is possible; for example, instead of the four box drawers illustrated, two box drawers can be provided over a file drawer, or two file drawers may be provided in place of the four box drawers. With respect to the storage unit 600, the door may be omitted therefrom and there also may be provided therein an adjustable shelf of the same construction and mounted in the same manner as the shelf 350 in the storage unit 200. A lesser number or a greater number of storage units might also be included in the storage assembly 100, the length of the top 101 and the length of the base 150 being adjusted accordingly.

Fundamentally, the storage unit 100 is formed of sheet metal with the exception of the several parts mentioned during the above description. Furthermore, the sheet metal forming the various parts is of relatively light gauge, as will be appreciated from the following examples of the gauge of sheet metal utilized to form the various parts of the storage assembly 100. For example, in a typical illustrative embodiment of the top 101, the top plate 102 is formed of 20 gauge steel, the edging 103 is formed of 18 gauge steel, the reinforcing sheet 110 is formed of 24 gauge steel and the mounting channels 120 are formed of 18 gauge steel. In an illustrative example of the construction of the base 150, the front frame member 151 is formed of 20 gauge steel and the rear frame member is formed of 20 gauge steel and the braces 165 are formed of 18 gauge steel. In illustrative examples of the storage units 200, 400 and 600, the bodies 201, 401 and 601 thereof are formed of 20 gauge steel, the channels forming the front frames 210, 410 and 610 are formed of 14 gauge steel, the rear top supports 220, 420 and 620 are formed of 18 gauge steel; the doors 240, 260 and 280 have the front panels and the reinforcing sheets thereof formed of 22 gauge steel while the several pick-up arms are formed of 16 gauge steel; the shelf 350 is formed of 20 gauge steel while the brackets 360 therefor are formed of 14 gauge steel.

From the above description it will be seen that there has been provided an improved storage assembly which fulfills all of the objects and advantages set forth above. More specifically, there has been provided an improved storage assembly including an integral elongated top 101 having a pair of spaced apart mounting channels 120 disposed on the underside thereof and secured thereto, and a plurality of storage unites 200, 400 and 600 arranged in side by side relationship beneath the top 101 and secured thereto by means of the mounting channels 120, thereby to provide a compact and strong construction with good interconnection between the parts. Furthermore, an integral base is provided joining the lower ends of the storage units in the storage assembly. A wide variety of storage units can be accommodated in the storage assembly such as cabinets, bookcases, pedestals with drawers therein, cabinets with doors or without doors, and the like. All of the storage units are connected to an improved top including a flat top plate 102 and a reinforcing sheet 110 with reinforcing ribs 112 therein attached to the underside of the top plate 102, a body of mastic 115 being disposed between the contacting surfaces of the top plate 102 and the reinforcing sheet 110 with welds made therethrough, thus to provide a strong connection between the parts and to provide good sound deadening properties therein. Furthermore, the interconnection is facilitated by an improved channel and mounting nut construction including the channels 120 and the special nuts 140.

An improved cabinet 200 having improved doors 240, 260 and 280 therein has been provided, each of the doors including an outer panel and a reinforcing sheet disposed on the rear thereof, the reinforcing sheet being corrugated and bonded to the outer panel both by an adhesive and welds extending through the adhesive to provide a rigid construction with good sound deadening properties. Not only are the improved doors lightweight yet rigid but are also provided with suitable pulls and pick-up arms and abutment surfaces and are mounted upon track structure so that one motion fully opens or closes all of the doors; for example, the user grasping the righthandmost door can move that door and all other doors to the fully opened or fully closed position with a single motion and conversely the user upon grasping the lefthandmost door can move that door and all the other doors to the fully opened or fully closed position with a single motion.

There further has been provided an improved shelf construction 350 wherein the shelf is supported inwardly of the associated cabinet 200 on the front frame 210 thereof and extends rearwardly therefrom in cantilever fashion with no other support needed therefor.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A storage assembly comprising an elongated top including a substantially flat elongated top plate, a pair of spaced apart one-piece mounting channels disposed adjacent to the underside of said top plate and secured thereto and depending downwardly therefrom, an edging extending around the periphery of said top plate and including a dependent side flange that extends downwardly well below said mounting channels; a plurality of storage units arranged in side by side relationship beneath said top and extending from adjacent one end thereof to adjacent the other end thereof, each of said storage units including a body having a front frame positioned adjacent to the forward end thereof and a rear top support positioned adjacent to the rear end thereof, all of said front frames being in general alignment with one of said mounting channels and all of said top supports being in general alignment with the other of said mounting channels, and means securing said front frames and said top supports to the adjacent mounting channels, thereby to connect said storage units to said top; and a pair of finishing panels disposed respectively adjacent to the outermost sides of the end ones of said storage units, and means securing said finishing panels to the adjacent ones of said storage units; said dependent side flange on said top extending downwardly below the connections between said top and said storage units and below the connections between said storage units and said finishing panels, thereby to conceal said connections from view.

2. The storage assembly set forth in claim 1, and further comprising a longitudinally extending unitary base disposed beneath said storage units, and means securing each of said storage units to said base.

3. The storage assembly set forth in claim 2, wherein said base has a plurality of depending feet thereon for supporting said storage assembly upon an underlying support surface.

4. A storage assembly comprising an elongated top including a substantially flat elongated top plate, a pair of spaced apart one-piece mounting channels disposed adjacent to the underside of said top plate and secured thereto, an edging extending around the periphery of said top plate and including a dependent side flange that extends downwardly well below said mounting channels; a plurality of storage units arranged in side by side relationship beneath said top and extending from adjacent one end thereof to adjacent the other end thereof, each of said storage units including a body having a front frame positioned adjacent to the forward end thereof and a rear top support positioned adjacent to the rear end thereof, all of said front frames being in general alignment with one of said mounting channels and all of said top supports being in general alignment with the other of said mounting channels; each of said front frames having an opening therethrough in general alignment with said one mounting channel, each of said top supports having a pair of openings thereon disposed respectively toward the rear corners of the associated storage unit, a plurality of bolts respectively disposed in said openings and extending upwardly into said channels and engaging nuts disposed therein, thereby to connect said storage units to said top, and a pair of finishing panels disposed respectively adjacent to the outermost sides of the end ones of said storage units, and means securing said finishing panels to the adjacent ones of said storage units; said dependent side flange on said top extending downwardly below the connections between said top and said storage units and below the connections between said storage units and said finishing panels, thereby to conceal said connections from view.

5. A storage assembly comprising an elongated top including a substantially flat elongated top plate, a reinforcing sheet disposed adjacent to the underside of said top plate and having a plurality of longitudinally spaced apart attachment portions and a plurality of longitudinally extending reinforcement ribs disposed between adjacent pairs of said attachment portions and spaced from the underside of said top plate, a body of mastic disposed between each of said attachment portions and the underside of said top plate, said attachment portions being welded to the underside of said top plate through said bodies of mastic, a pair of spaced apart mounting channels disposed adjacent to the underside of said top plate and extending in the general direction of said reinforcing ribs and secured to said top plate, an edging extending around the periphery of said top plate and including a dependent side flange which extends downwardly at least as far as said reinforcing ribs and said mounting channels; a plurality of storage units arranged in side by side relationship beneath said top and extending from adjacent one end thereof to adjacent the other end thereof, each of said storage units including a body having a front frame positioned adjacent to the forward end thereof and a rear top support positioned adjacent to the rear end thereof, all of said front frames being in general alignment with one of said mounting channels and all of said top supports being in general alignment with the other of said mounting channels and means securing said front frames and said top supports to the adjacent mounting channels, thereby to connect said storage units to said top, and a pair of finishing panels disposed respectively adjacent to the outermost sides of the end ones of said storage units, and means securing said finishing panels to the adjacent ones of said storage units, said dependent side flange on said top extending downwardly below the connections between said storage units and said finishing panels, thereby to conceal said connections from view.

6. The storage assembly set forth in claim 1, and further comprising a covering for said top plate extending over the entire upper surface thereof and secured thereto, and a trim extending around the periphery of said top plate and disposed between said top plate and said edging and secured thereto.

7. A storage assembly comprising an elongated top including a substantially flat elongated top plate, a pair of spaced apart one-piece mounting channels disposed adjacent to the underside of said top plate and secured thereto, a plurality of storage units arranged in side by side relationship beneath said top and extending from adjacent one end thereof to adjacent the other end thereof, each of said storage units including a body having a front frame positioned adjacent to the forward end thereof and a rear top support positioned adjacent to the rear end thereof, all of said front frames being in general alignment with one of said mounting channels and all of said top supports being in general alignment with the other of said mounting channels, each of said front frames having at least one opening therethrough in general alignment with said one mounting channel, each of said top supports having at least one opening therethrough in general alignment with said other mounting channel, a plurality of bolts respectively disposed in said opening and extending upwardly into said channels and engaging nuts disposed therein, thereby to connect said storage units to said top, and a pair of finishing panels disposed respectively adjacent to the outermost sides of the end ones of said storage units, and means securing said finishing panels to the adjacent ones of said storage units.

8. A storage assembly comprising an elongated top including a substantially flat elongated top plate, a pair of spaced apart one-piece mounting channels disposed adjacent to the underside of said top plate and secured thereto, a plurality of storage units arranged in side by side relationship beneath said top and extending from adjacent one end thereof to adjacent the other end thereof, each of said storage units including a body having a front frame positioned adjacent to the rear end thereof, all of said front frames being in general alignment with one of said mounting channels and all of said top supports being in general alignment with the other of said mounting channels, means securing said front frames and said top supports to the adjacent mounting channels, thereby to connect said storage units to said top, an elongated base disposed beneath said storage units, means securing each of said storage units to said base, a pair of finishing panels disposed respectively adjacent to the outermost sides of the end ones of said finishing panels to the adjacent ones of said storage units.

9. The storage assembly set forth in claim 8, wherein said base includes spaced apart front and rear frame members, and a pair of side frame members joined to the aligned pairs of ends of said front and rear frame members.

10. The storage assembly set forth in claim 8, wherein said base includes spaced apart integral U-shaped front and rear frame members and a pair of side frame members joined to the aligned pairs of ends of said front and rear frame members, each of said frame members having thereon an upper flange and a lower flange extending inwardly therefrom.

11. The storage assembly set forth in claim 10, wherein said base further includes a plurality of spaced apart braces directed substantially parallel to said side frame members and extending between said front and rear frame members, means connecting the opposite ends of each of said braces respectively to the upper flanges associated with said front and rear frame members, said braces and the upper flanges associated with said side frame members having openings therein, and a plurality of fasteners extending through said openings and engaging said storage units to connect said storage units to said base.

12. A storage assembly comprising an elongated top including a substantially flat elongated top plate, a pair of spaced apart one-piece mounting channels disposed adjacent to the underside of said top plate and secured thereto, a plurality of storage units arranged in side by side relationship beneath said top and extending from adjacent one end thereof to adjacent the other end thereof, each of said storage units including a body having a front frame positioned adjacent to the forward end thereof and a rear top support positioned adjacent to the rear end thereof, all of said front frames being in general alignment with one of said mounting channels and all of said top supports being in general alignment with the other of said mounting channels, and means securing said front frames and said top supports to the adjacent mounting channels, thereby to connect said storage units to said top; and a pair of finishing panels disposed respectively adjacent to the outermost sides of the end ones of said storage units, and means securing said finishing panels to the adjacent ones of said storage units.

13. The storage assembly set forth in claim 4, wherein said openings in said top supports are elongated and are arranged with the longitudinal axes thereof diverging rearwardly, whereby to accommodate minor variations in the spacing between said mounting channels.

14. A storage assembly comprising an elongated top including a substantially flat elongated top plate, a unitary reinforcing sheet disposed adjacent to the underside of said top plate and having a plurality of longitudinally spaced apart attachment portions secured to the underside of said top plate and a plurality of longitudinally extending reinforcement ribs disposed between adjacent pairs of said attachment portions and spaced from the underside of said top plate, a pair of spaced apart mounting channels disposed adjacent to the underside of said top plate and extending in the general direction of said reinforcing ribs and secured to said top plate and depending downwardly therefrom, an edging extending around the periphery of said top plate and including a dependent side flange which extends downwardly at least as far as said reinforcing ribs and said mounting channels; a plurality of storage units arranged in side by side relationship beneath said top and extending from adjacent one end thereof to adjacent the other end thereof, each of said storage units including a body having a front frame positioned adjacent to the forward end thereof and a rear top support positioned adjacent to the rear end thereof, all of said front frames being in general alignment with one of said mounting channels and all of said top supports being in general alignment with the other of said mounting channels, and means securing said front frames and said top supports to the adjacent mounting channels, thereby to connect said storage units to said top; and a pair of finishing panels disposed respectively adjacent to the outermost sides of the end ones of said storage units, and means securing said finishing panels to the adjacent ones of said storage units; said dependent side flange on said top extending downwardly below the connections between said top and said storage units and below the connections between said storage units and said finishing panels, thereby to conceal said connections from view.

15. The storage assembly set forth in claim 14, wherein said top plate and said edging and said reinforcing sheet are all formed of sheet metal, and said attachment portions and said edging are secured to the underside of said top plate by welding.

16. The storage assembly set forth in claim 14, wherein said reinforcing ribs have an extent in a direction perpendicular to said top plate substantially greater than the extent of said mounting channels in a direction perpendicular to said top plate.

17. The storage assembly set forth in claim 14, and further comprising a covering for said top plate extending over the entire upper surface thereof and secured thereto, and a trim extending around the periphery of said top plate and disposed between said top plate and said edging and secured thereto.

18. The storage assembly set forth in claim 14, wherein each of said mounting channels includes a pair of downwardly extending side walls having a pair of inwardly directed retaining flanges disposed on the lower edges thereof and extending inwardly toward each other, the inner edges of said retaining flanges being spaced apart a predetermined distance, a plurality of nuts engaged in said mounting channel and supported by said retaining flanges, each of said nuts having a generally rhomboidal body including a pair of substantially parallel longer sides and a pair of substantially parallel shorter sides, the distance between said longer sides being less than the distance between the inner edges of said retaining flanges, whereby said nut can be inserted in said mounting channels at any place therealong, the distance between the corners of said nut at the acute angle intersections of the sides thereof being greater than the distance between said side walls, thereby to limit the turning of said nut with respect to said mounting channel while positioned on said retaining flanges, an outwardly projecting body portion on said nut having a width slightly less than the distance between the inner edges of said retaining flanges extending therebetween when said corners are in engagement with said side walls, and a plurality of fasteners connected to said front frames and said top supports and engaging one of said nuts in the associated mounting channel, thereby to interconnect said storage units by means of said channels and said nuts and said fasteners.

19. The storage assembly set forth in claim 18, wherein each of said nuts has a threaded opening substantially centrally thereof, and each of said fasteners is a threaded bolt engageable in the threaded opening of an associated nut.

20. A cabinet comprising a body including a rear wall and a pair of forwardly projecting side walls integral therewith and defining a front opening therebetween, a front frame positioned at the forward ends of said side walls and disposed therebetween and completely surrounding said front opening and respectively secured to said side walls, a rear top support positioned adjacent to the upper edge of said rear wall and extending between said side walls adjacent to the upper edges thereof and respectively secured thereto, and a door positioned at the forward end of said body for at least partially closing said front opening, said door including an outer panel arranged generally vertically in said front opening, and a reinforcing sheet disposed adjacent to the rear side of said front panel and having a plurality of vertically extending spaced apart attachment portions secured to the rear side of said front panel and a plurality of longitudinally extending reinforcement ribs disposed between adjacent pairs of said attachment portions and spaced from the rear side of said front panel.

21. The cabinet set forth in claim 20, wherein said front panel and said reinforcing sheet are both formed of sheet metal, and said attachment portions are secured to the rear side of said front panel by welding.

22. The cabinet set forth in claim 20, and further comprising a body of mastic disposed between each of said attachment portions and the rear side of said front panel, said attachment portions being welded to the rear side of said front panel through said bodies of mastic.

23. The cabinet set forth in claim 20 and further comprising side flanges on the opposite ends of said front panel extending rearwardly therefrom, said reinforcing sheet extending between said side flanges and having end flanges secured to said front panel side flanges.

References Cited

UNITED STATES PATENTS

| | | | |
|---|---|---|---|
| 1,897,568 | 2/1933 | Bales | 312—257 |
| 1,918,780 | 7/1933 | Rand | 312—257 |
| 2,141,954 | 12/1938 | Jones | 312—256 |
| 2,225,958 | 12/1940 | Mandel | 312—257 X |
| 2,646,325 | 7/1953 | Abrahamson | 312—194 X |
| 2,987,362 | 6/1961 | Bernath | 312—257 |
| 3,059,983 | 10/1962 | Strom | 312—257 X |
| 3,125,387 | 3/1964 | Abrahamson | 312—195 |
| 3,132,910 | 5/1964 | Vigna | 312—264 |
| 3,222,113 | 12/1965 | Hamilton et al. | 312—195 |

FOREIGN PATENTS

| | | |
|---|---|---|
| 1,254,324 | 1/1961 | France. |

JAMES T. McCALL, *Primary Examiner.*